(12) United States Patent
Bhattad et al.

(10) Patent No.: US 10,904,845 B2
(45) Date of Patent: Jan. 26, 2021

(54) SYNCHRONIZATION CHANNEL FOR A WAKE-UP RECEIVER (WUR) IN A COMMUNICATION DEVICE

(71) Applicant: QUALCOMM INCORPORATED, San Diego, CA (US)

(72) Inventors: Kapil Bhattad, Bangalore (IN); Peter Pui Lok Ang, San Diego, CA (US); Alberto Rico Alvarino, San Diego, CA (US); Hao Xu, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 15/976,943

(22) Filed: May 11, 2018

(65) Prior Publication Data

US 2018/0332549 A1    Nov. 15, 2018

(30) Foreign Application Priority Data

May 15, 2017   (IN) .............................. 201741016972

(51) Int. Cl.
*H04W 56/00* (2009.01)
*H04W 52/02* (2009.01)

(52) U.S. Cl.
CPC ..... *H04W 56/001* (2013.01); *H04W 52/0216* (2013.01); *H04W 52/0219* (2013.01); *H04W 52/0229* (2013.01); *H04W 56/0015* (2013.01)

(58) Field of Classification Search
CPC .......... H04W 56/001; H04W 52/0216; H04W 52/0219; H04W 56/0015; H04W 52/0229

USPC .................................................. 370/350, 336
See application file for complete search history.

(56) References Cited

U.S. PATENT DOCUMENTS

| 8,185,726 | B2* | 5/2012 | Taha ................. H04W 52/0229 713/1 |
| 9,264,997 | B2* | 2/2016 | Gaal ....................... H04L 5/001 |
| 2012/0033646 | A1* | 2/2012 | Luo ..................... H04J 11/0056 370/336 |
| 2016/0373237 | A1* | 12/2016 | Shellhammer ........ H04L 5/0053 |
| 2017/0094621 | A1* | 3/2017 | Xu ......................... H04L 47/125 |
| 2017/0264406 | A1* | 9/2017 | Lei ...................... H04L 27/2663 |
| 2018/0324722 | A1* | 11/2018 | Vos ..................... H04W 56/001 |

FOREIGN PATENT DOCUMENTS

| WO | 2016019251 A1 | 2/2016 |
| WO | 2016119061 A1 | 8/2016 |

OTHER PUBLICATIONS

International Search Report and Written Opinion—PCT/US2018/032488—ISA/EPO—dated Jul. 20, 2018.

* cited by examiner

*Primary Examiner* — Kwang B Yao
*Assistant Examiner* — Syed M Bokhari
(74) *Attorney, Agent, or Firm* — Smith Tempel Blaha, LLC

(57) ABSTRACT

A method for communication includes receiving in a user equipment (UE) a configuration for a modified synchronization channel, and the UE periodically awakening and synchronizing to a communication channel using the modified synchronization channel.

21 Claims, 23 Drawing Sheets

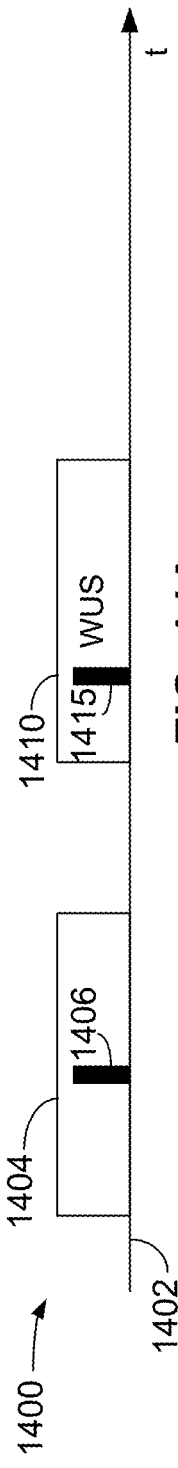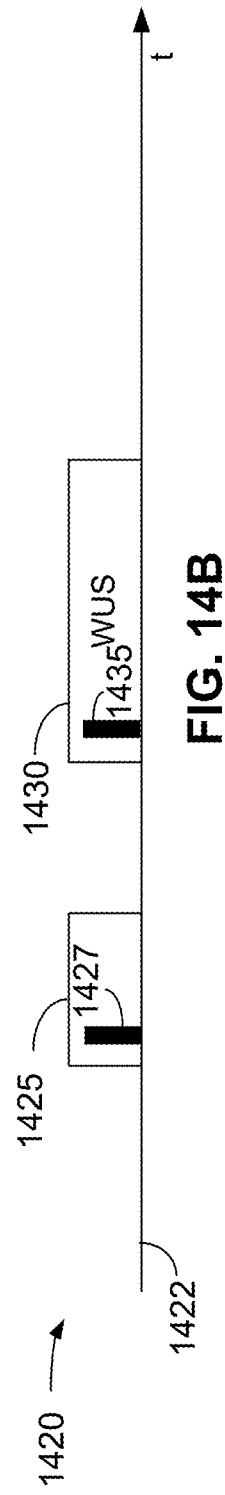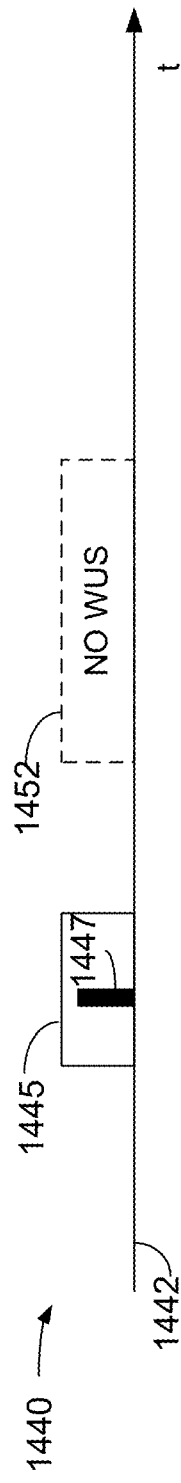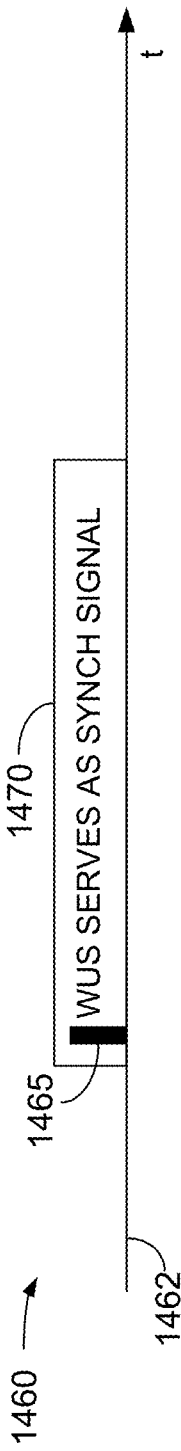

SYNCHRONIZATION CHANNEL FOR A WAKE-UP RECEIVER (WUR) IN A COMMUNICATION DEVICE

RELATED APPLICATION & PRIORITY CLAIM

This Application claims priority to and the benefit of the filing date of India Provisional Patent Application No. 201741016972, filed May 15, 2017, entitled "SYNCHRONIZATION CHANNEL FOR A WAKE-UP RECEIVER (WUR) IN A COMMUNICATION DEVICE," and the contents thereof are incorporated herein in their entirety by this reference as if fully set forth below and for all applicable purposes.

TECHNICAL FIELD

The technology discussed below relates to wireless communication systems, and more particularly, to a synchronization channel for a wake-up receiver (WUR) in a communication device. Embodiments enable and provide a synchronization channel to efficiently awaken a receiver in a communication device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of another communication standard is referred to as 5G.

5G represents an evolution of LTE technology including, for example, various advancements to the wireless interface, processing improvements, and the enablement of higher bandwidth to provide additional features and connectivity.

Wireless communications devices, sometimes referred to as user equipment (UE), may communicate with a base station or may communicate directly with one or more other UEs. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected device.

A type of communication that sends small amounts of information is referred to as machine-type-communication (MTC). Machine-type-communication generally refers to communications that are characterized by automatic data generation, exchange, processing, and actuation among machines with little or no human intervention.

The Internet of things (IoT), also referred to as the Internet of everything (IoE), is the inter-networking of physical devices, vehicles (sometimes referred to as "connected devices" and/or "smart devices"), buildings, and other items that may be embedded with electronics, software, sensors, actuators, and network connectivity that enable these objects to collect and exchange data and other information.

Many MTC and IoT communication applications involve the relatively infrequent exchange of small amounts of data. Therefore, it is desirable to minimize the amount of resources used in MTC and IoT communication, and in other communications.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments include a user equipment (UE) receiving a configuration for a modified synchronization channel, and the UE periodically awakening and synchronizing to a communication channel using the modified synchronization channel.

Another aspect of the disclosure provides an apparatus for communication including a user equipment (UE) configured to receive a configuration for a modified synchronization channel, and the UE configured to periodically awaken and synchronize to a communication channel using the modified synchronization channel.

Another aspect of the disclosure provides an apparatus for communication including a user equipment (UE) configured to receive a configuration for a modified synchronization channel, the UE configured to periodically awaken and synchronize to a communication channel using the modified synchronization channel, the modified synchronization channel comprising a modified synchronization signal, the modified synchronization signal having a signal density more dense than a signal density of an existing synchronization signal and having a period that is less frequent than a period of the existing synchronization signal.

Another aspect of the disclosure provides a device including means for a user equipment (UE) receiving a configuration for a modified synchronization channel, and means for the UE periodically awakening and synchronizing to a communication channel using the modified synchronization channel.

Another aspect of the disclosure provides a non-transitory computer-readable medium storing computer executable code for communication, the code executable by a processor to cause a user equipment (UE) to receive a configuration for a modified synchronization channel, and cause the UE to periodically awaken and synchronize to a communication channel using the modified synchronization channel.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 14A, FIG. 14B, FIG. 14C, and FIG. 14D are time line diagrams showing exemplary embodiments of synchronization signals and wake-up signals.

DETAILED DESCRIPTION

Figure 1:
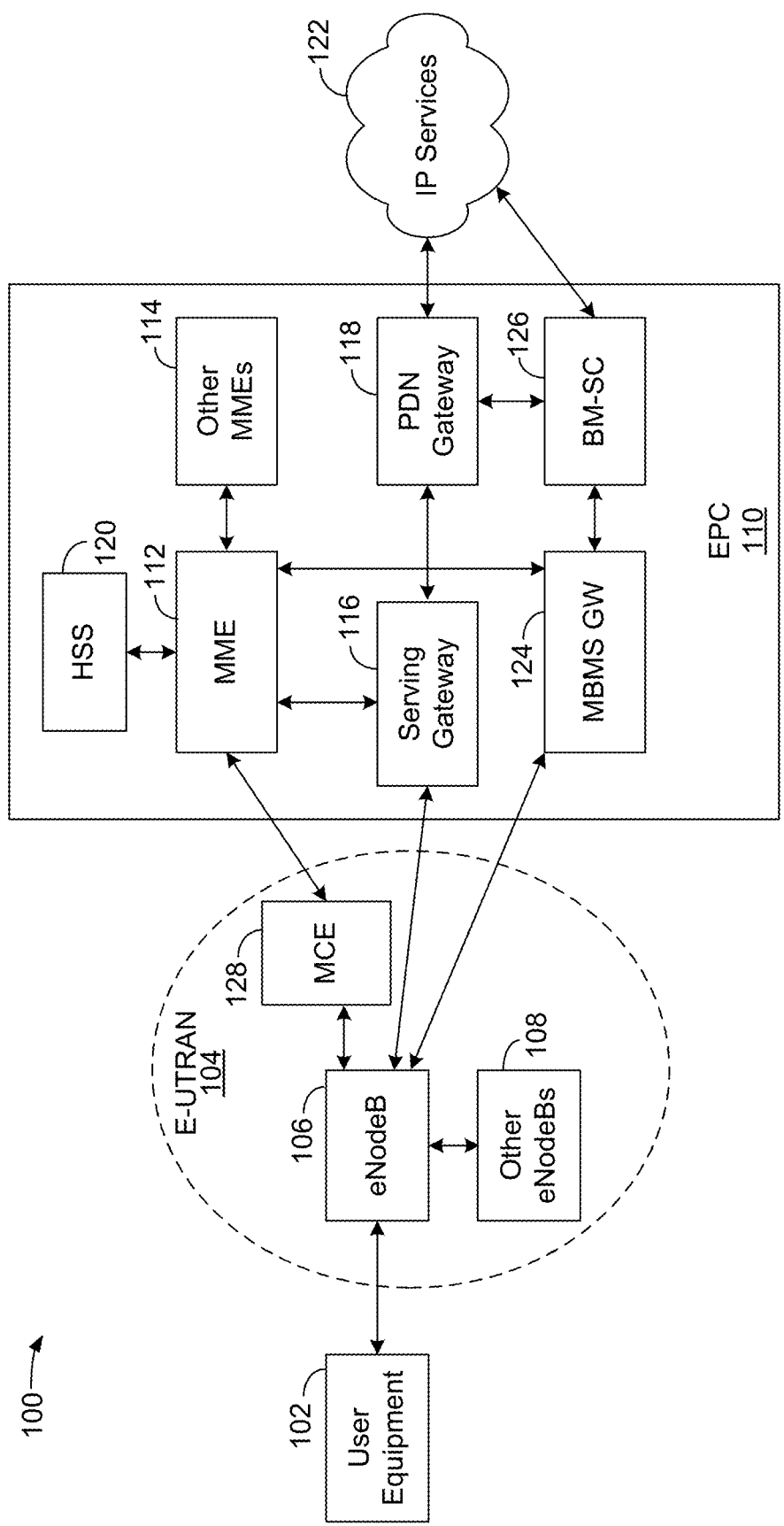
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

A UE may be in a number of different states. For example, RRC-Connected (Radio Resource Control-Connected) refers to a state where the UE and the base station are connected and the UE is available for exchanging information with the base station. In what is referred to as RRC-Idle (Radio Resource Control-Idle), the UE is in a state in which the UE is not exchanging information with a base station, but where the UE attempts to find and maintain a service connection with the base station. In idle mode the UE may be in DRX state or eDRX state.

When a base station and a UE are in the RRC-connected state, the UE may sleep in two situations. In a first situation, the UE may enter what is referred to as C-DRX (connected-discontinuous reception) mode, where the UE may enter a period of "macro sleep", where it may sleep for a few subframes up to 1000's of subframes (for example for up to approximately 2.560 seconds in LTE). This may occur during long or short gaps in transmissions from the base station when the UE is in in the C-DRX mode.

In another situation, the UE may enter what is referred to as "micro sleep", where it may sleep for very short durations such as less than one subframe (for example for up to 12 symbol periods (approximately 170 micro seconds (us)). This may occur, for example, when the UE monitors a control channel at the beginning of a subframe and identifies that there is no data (physical downlink shared channel (PDSCH)) scheduled for the current subframe, and may enter a micro sleep mode until the next subframe boundary. Both "macro-sleep" and "micro-sleep" are examples of a UE entering a "light sleep" state or period.

Another DRX state is referred to as eDRX (extended DRX), where the UE may sleep for extended periods of time, on the order of many minutes, or hours. For example, this eDRX state is particularly useful for UE devices where there may be long periods, on the order of minutes or hours, where no transmission is expected. The eDRX state allows a UE to significantly reduce power consumption. This sleep situation may be referred to as "deep sleep." In this deep-sleep state, many more components of the UE may be powered down compared to a light-sleep state thereby reducing power consumption over the light sleep state. Returning to an active state from a deep-sleep state may however consume more energy than returning to an active state from a light-sleep state and hence deep-sleep is used when the sleep cycles are longer.

Exemplary embodiments of the disclosure are directed to systems and methods for implementing a synchronization channel for awakening a receiver in a communication device. According to some examples, wake-up signaling can include sending a small, for example, a one (1) bit transmission, that may alert a receiver that a physical downlink control channel (PDCCH) (or machine-type physical downlink control channel MPDCCH or narrowband physical downlink control channel (NPDCCH) (for NB-IoT)) transmission, or other communication, is present for that communication device. In an exemplary embodiment, the terms PDCCH, MPDCCH, and NPDCCH may be used interchangeably to refer to a downlink physical control channel. The small, one (1) bit signal may be referred to as a "wake-up signal" (WUS). In an exemplary embodiment, the wake-up signal may also be an ON-OFF signal. Other low-bit count signals may also be used as a wake-up signal.

A receiver, or a portion of a receiver, may be used to monitor for the wake-up signal. Such a receiver may be referred to as a "wake-up receiver" (WUR). As used herein, the term "wake-up receiver" (WUR) may refer to a separate low power receiver, low power receiver circuitry that is part of another receiver, or a portion of a receiver or a modem in a communication device. A WUR may be operable in a low power consumption state, or for a brief period of time, and be configured to receive the wake-up signal, and process the wake-up signal to awaken the receiver only when a communication is destined for that UE or only when the UE may have data to send.

There are a number of different situations in which a UE may establish, or reestablish synchronization with a communication network from a sleep state. In an exemplary embodiment, for DRX situations in which the UE enters light sleep, a primary concern is compensating for small amounts of timing error (e.g., timing error on the order of symbol length or subframe size, etc.) and frequency drift. In such situations, a UE may use one or more of PSS/SSS/NRS/CRS, etc., for timing and frequency correction, and cell confirmation. For DRX sleep cycles that may occur over, for example, 20 seconds or more, a UE may perform a full PSS/SSS cycle or even a physical broadcast channel (PBCH) decode to obtain full timing and frequency synchronization with a base station when timing error may be large (for example on the order of radio frames).

In an exemplary embodiment, for eDRX cycles where a UE may enter deep sleep, timing and frequency drift may be, on the order of 5 parts per million (ppm) to 50 ppm or more. For example, in one hour, timing drift may approach 3600e3 ms×5e-6, which may be 18 ms to 180 ms. In such circumstances, a UE may perform a full synchronization, perform a physical broadcast channel (PBCH) decode, perform a system information block (SIB) decode, etc.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

As used herein, the term "NR" corresponds to "new radio" which is a way of referring to a radio interface that may be part of the 5G communication methodology. The term "NR" can be used interchangeably with the term "5G." While certain techniques and technical description may be provided with reference to LTE networks, those skilled in the art will understand that other networks may also be utilized using concepts and principles described (e.g., including 5G or NR networks).

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102.

UEs can include a wide variety of components and/or devices. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
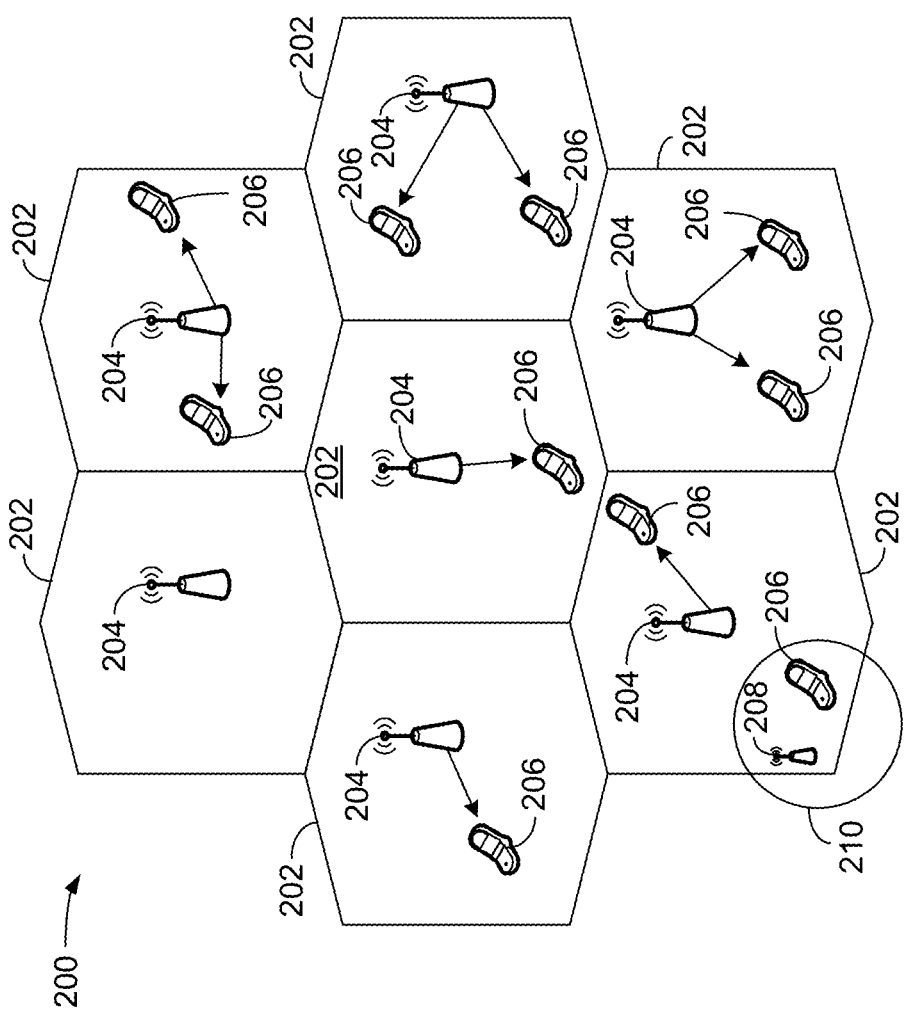
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are favorable. When channel conditions are less favorable, beamforming may be used to focus the transmission energy in one or more directions. This may be achieved by spatially precoding the data for transmission through multiple antennas. To achieve robust coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-TDMA in the form of a DFT-spread OFDM signal to compensate for high peak-to-average power ratio (PAPR).

Figure 3:
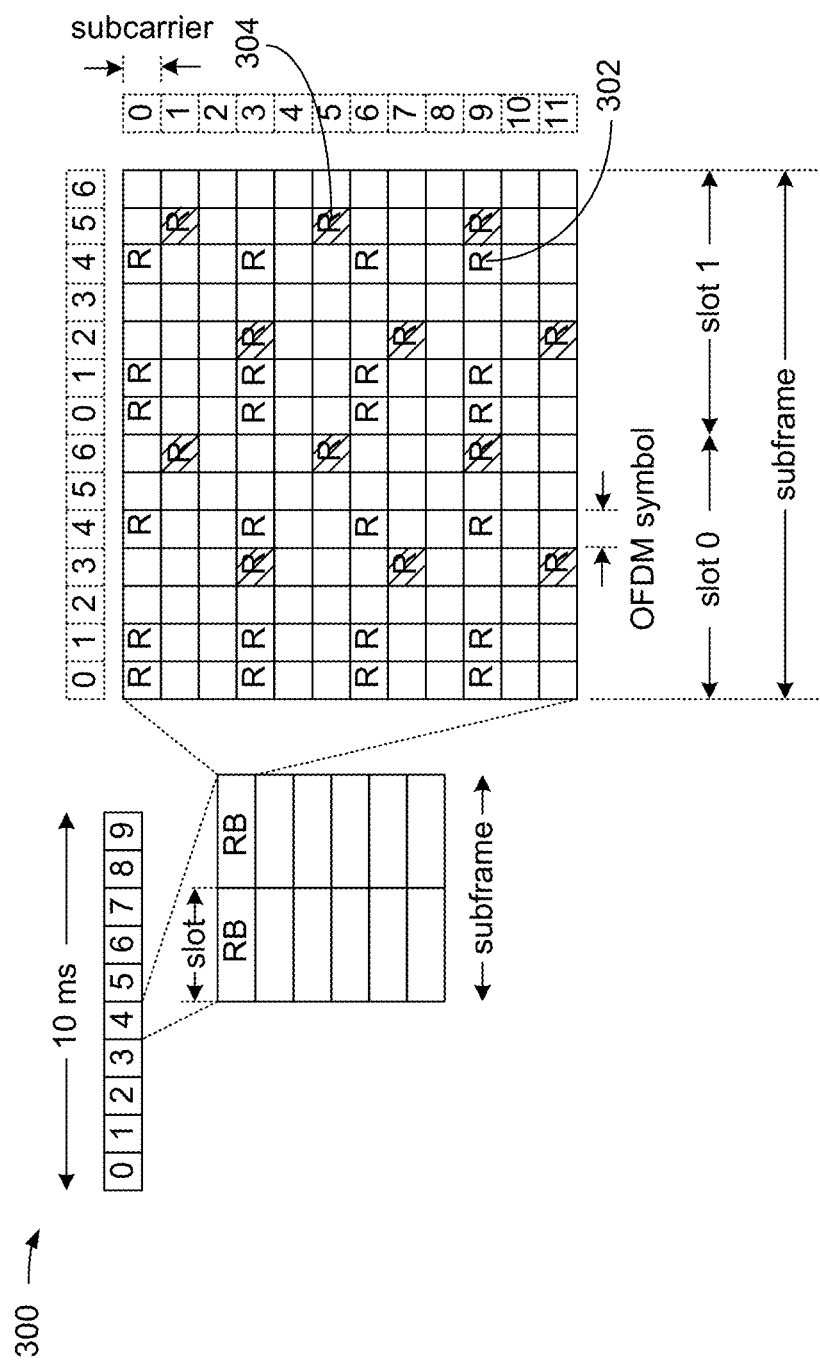
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302, UE-specific RS (UE-RS) 304. For narrowband LTE, a narrowband cell specific reference signal (NRS) may be used. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
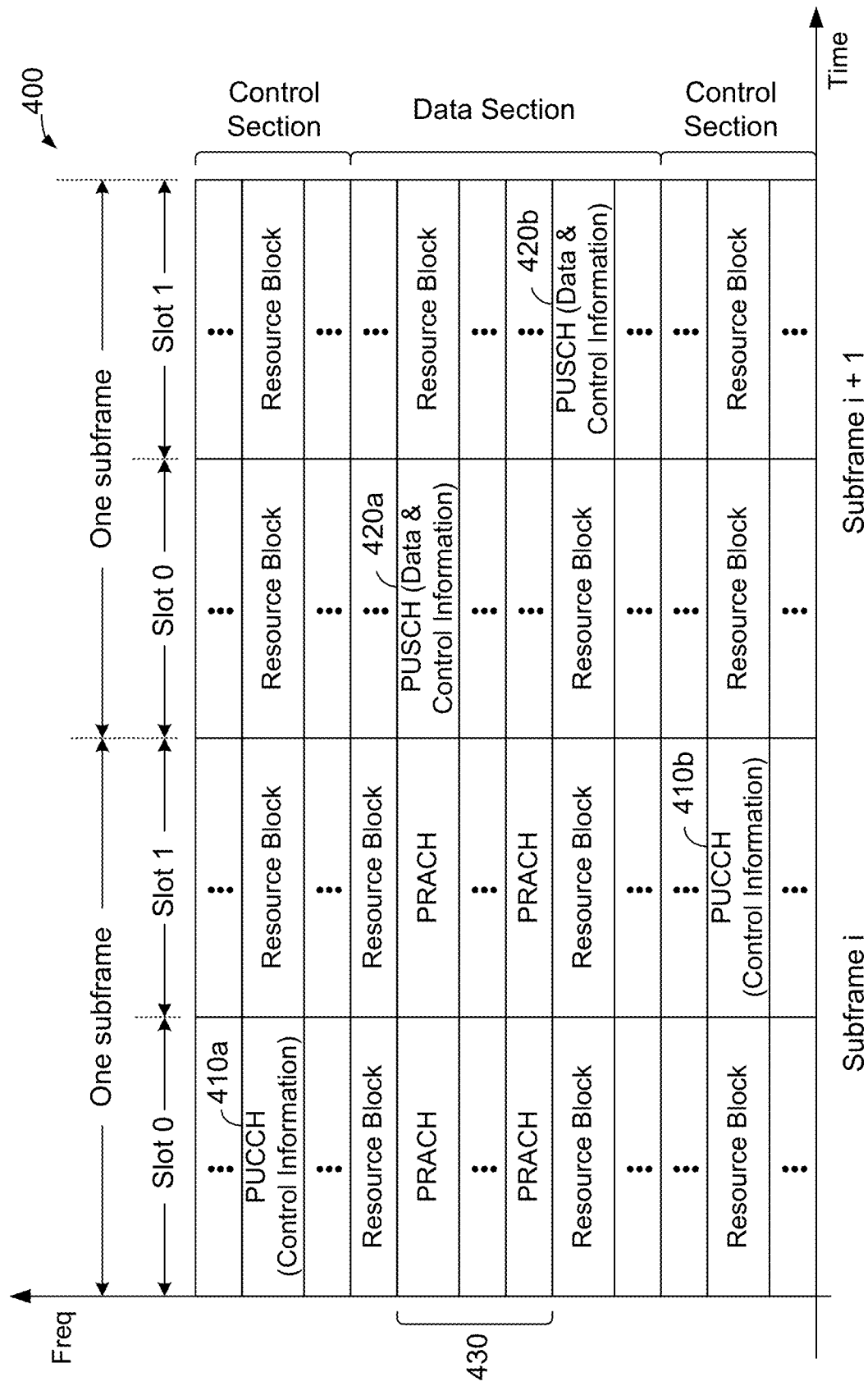
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
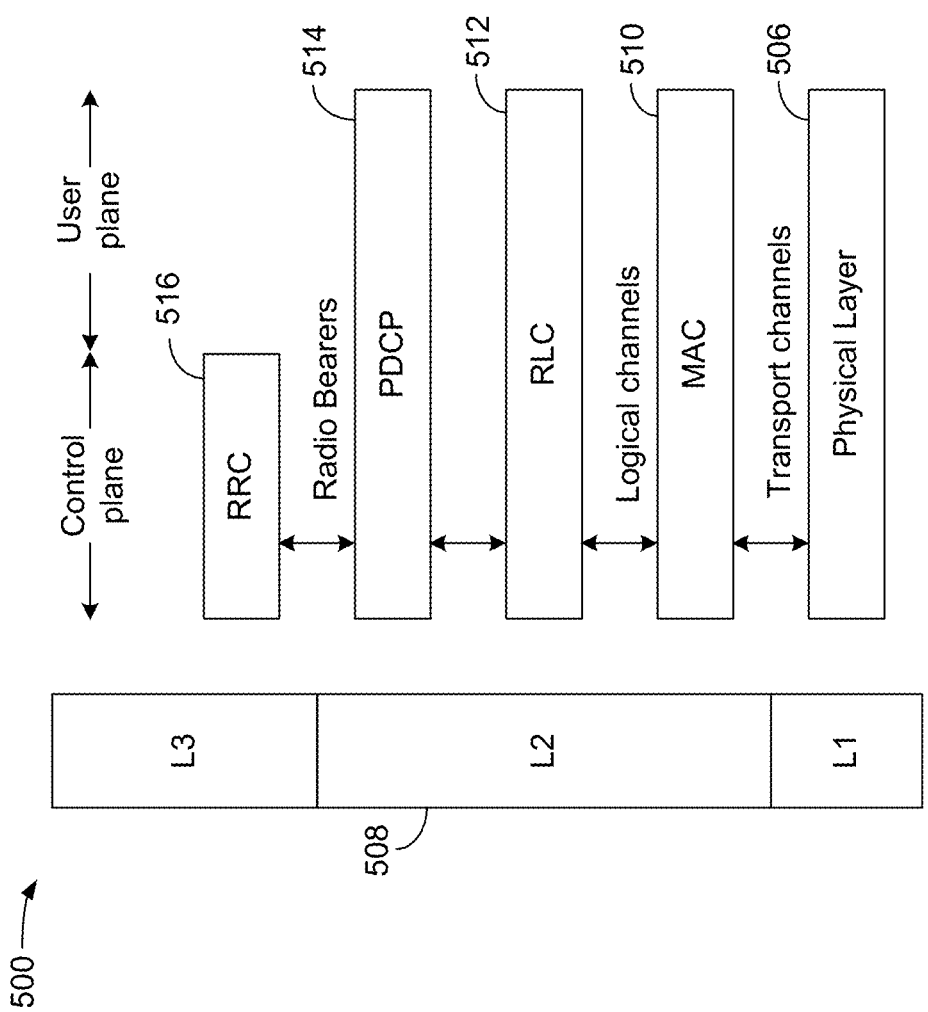
FIG. 5 is a diagram illustrating an example of a radio protocol architecture for user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506. Layer 3 (L3 Layer) may include one or more applications, and a radio resource control (RRC) sublayer 516.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
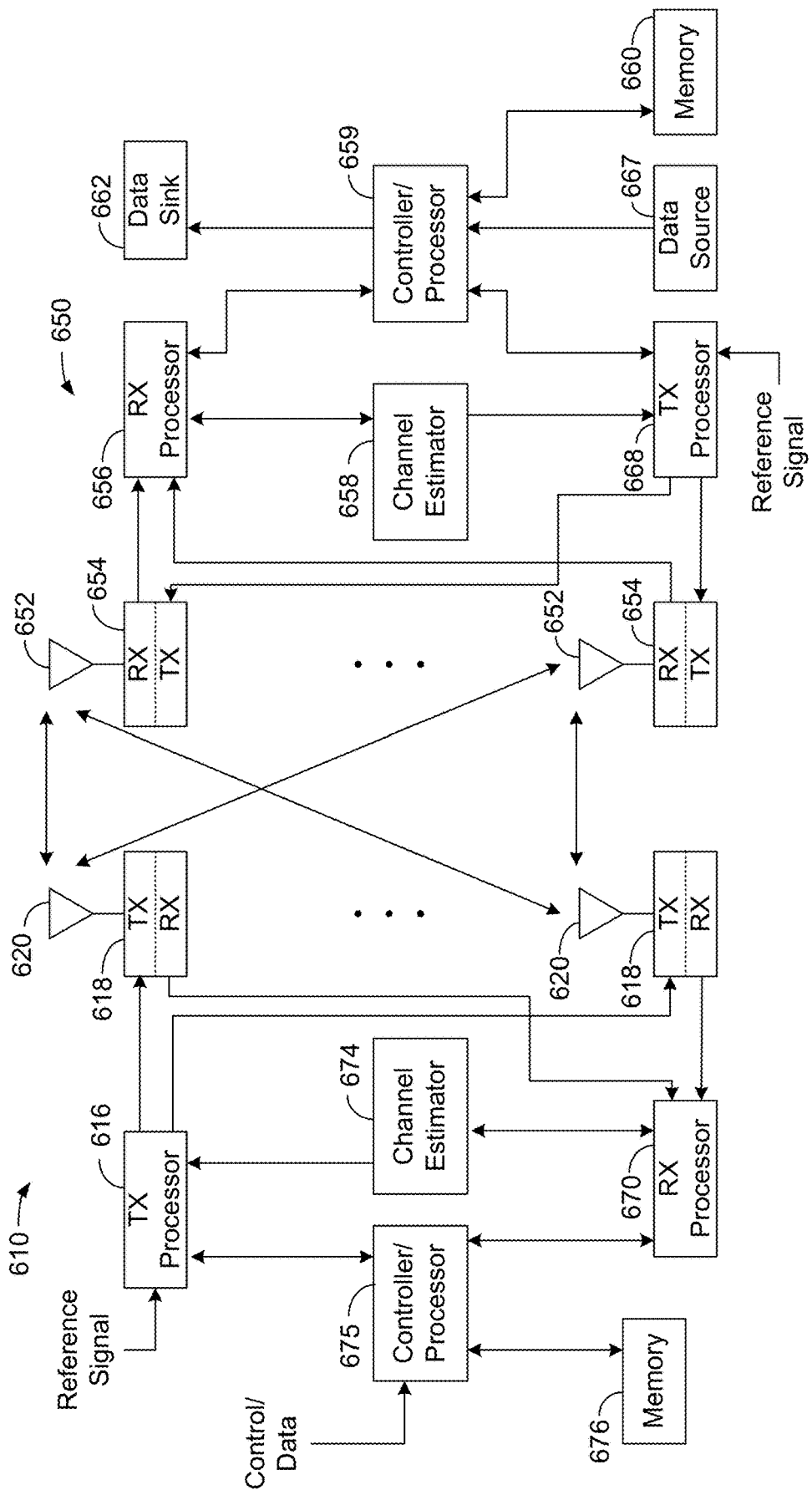
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an exemplary embodiment, one or both of the eNB 610 and the UE 650 may have logic, software, firmware, configuration files, etc., to allow the MCT/IoT communications described herein.

Figure 7:
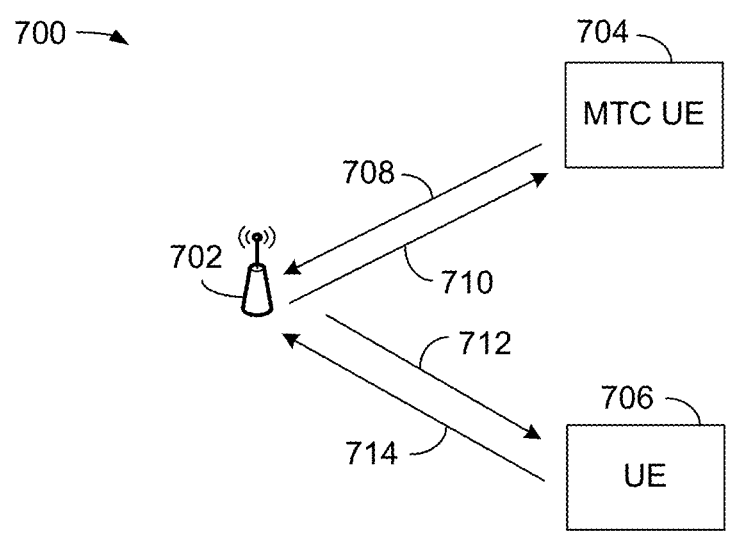
FIG. 7 is a diagram illustrating a communication system in accordance with various aspects of the present disclosure.

FIG. 7 is a diagram 700 illustrating a communication system in accordance with various aspects of the present disclosure. FIG. 7 includes a node 702, an MTC UE 704, and a UE 706 (also referred to as a "non-MTC UE"). The node 702 can be a macro node (e.g., an eNB), femto node, pico node, or similar base station, a mobile base station, a relay, a UE (e.g., communicating in peer-to-peer or ad-hoc mode with another UE), a portion thereof, and/or substantially any component that communicates control data in a wireless network. The MTC UE 704 and non-MTC UE 706 can each be a mobile terminal, a stationary terminal, a modem (or other tethered device), a portion thereof, and/or substantially any device that receives control data in a wireless network.

As shown in FIG. 7, the MTC UE 704 receives DL transmissions 710 from eNB 702 and sends UL transmissions 708 to the eNB 702. In one aspect, the DL and UL transmissions 710 and 708 may include either MTC control information or MTC data. As further shown in FIG. 7, the UE 706 receives DL transmissions 712 from eNB 702 and sends UL transmissions 714 to the eNB 702.

Figure 8:
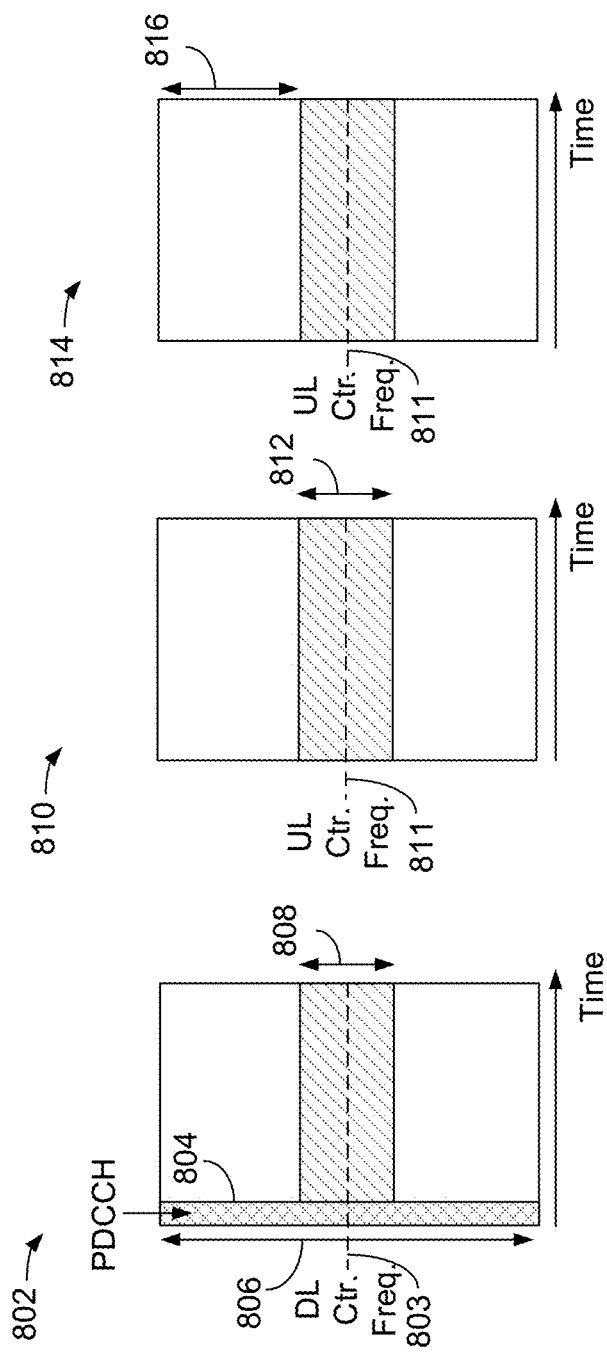
FIGS. 8A, 8B, and 8C are diagrams illustrating narrowband operation of MTC UEs in a large bandwidth allocated for non-MTC UEs in accordance with various aspects of the present disclosure.

FIGS. 8A through 8C are diagrams 802, 810, and 814 illustrating narrowband operation of MTC UEs in a large bandwidth allocated for non-MTC UEs in accordance with various aspects of the present disclosure. FIG. 8A shows a large bandwidth 806 allocated for non-MTC UEs and further shows a DL center frequency 803. Accordingly, the DL operates in the center of the large bandwidth 806. In the configuration of FIG. 8A, shaded portion 804 is reserved for the physical downlink control channel (PDCCH). As further shown in FIG. 8A, narrow bandwidth 808 can be used for both UL and DL and can be used for a primary synchronization signal (PSS), secondary synchronization signal (SSS), physical broadcast channel (PBCH), SIB, and/or paging. For example, the narrow bandwidth can be 1.25 MHZ. FIG. 8B shows a UL center frequency 811 and the narrow bandwidth 812. For example, UL random access channel (RACH) messages (e.g., message 1 and message 3) can be communicated by MTC UEs in the UL center frequency 811 to facilitate access to the network. As shown in FIG. 8C, other UL transmissions can be communicated in a bandwidth different from narrow bandwidth 808, such as bandwidth 816. It should be understood that in FIGS. 8A through 8C, the small bandwidth 808 can be located in a region other than the center of the large bandwidth 806.

In a specific example, LTE allows the following transmission modes (TMs): TM1 for single antenna port, TM2 for transmit diversity, TM3 for open loop MIMO, TM4 for close loop MIMO, TM5 for multi-user MIMO, TM6 for single layer closed loop MIMO, TM7 for single layer beamforming with dedicated reference signal (RS), TM8 for dual layer beamforming with dedicated RS, TM9 for MIMO with up to 8 layer transmissions, and TM10 for coordinated multiple point (CoMP). For SIB/MIB transmission, as well as message 2 and message 4 for RACH, the default transmission modes are used: TM1 is used for single and TM2 is used for 2 transmit (Tx) antennas or 4 Tx antennas. The UE can be switched to another transmission mode based on UE specific radio resource control (RRC) signaling.

MIB or physical broadcast channel (PBCH) can contain various information bits, such as bandwidth information bits, physical HARQ indicator channel (PHICH) configuration bits, and SFN bits. The bandwidth information can be four bits; however, such bandwidth information may not be needed for MTC when narrowband operation is used. The PHICH configuration bits can be three bits (e.g., one bit for duration, two bits for PHICH group). However, such PHICH configuration may not be needed if NCT is used or if a fixed control region for PBCH subframe is used. The SFN bits can be eight bits of the most significant bits (MSB) (the other 2 bit from blind decoding of PBCH in 40 ms). The SFN bits can be signaled later in the payload. Antenna information can be conveyed by another signal. PBCH transmission matches around 4 antenna ports, space frequency block code (SFBC) or SFBC-frequency switched transmit diversity (FSTD) is used for antenna numbers of 2 or 4. Combined with 4 timing hypothesis and 3 antenna hypothesis, a total of 12 blind decoding is needed for current PBCH decoding.

Therefore, in order to reduce costs, MTC can be operated in a narrow band, e.g. six resource blocks (RBs). Considering cost saving as well as limited requirement on the data rate, the transmission mode can be restricted only to those without the support of spatial multiplexing.

Figure 9:
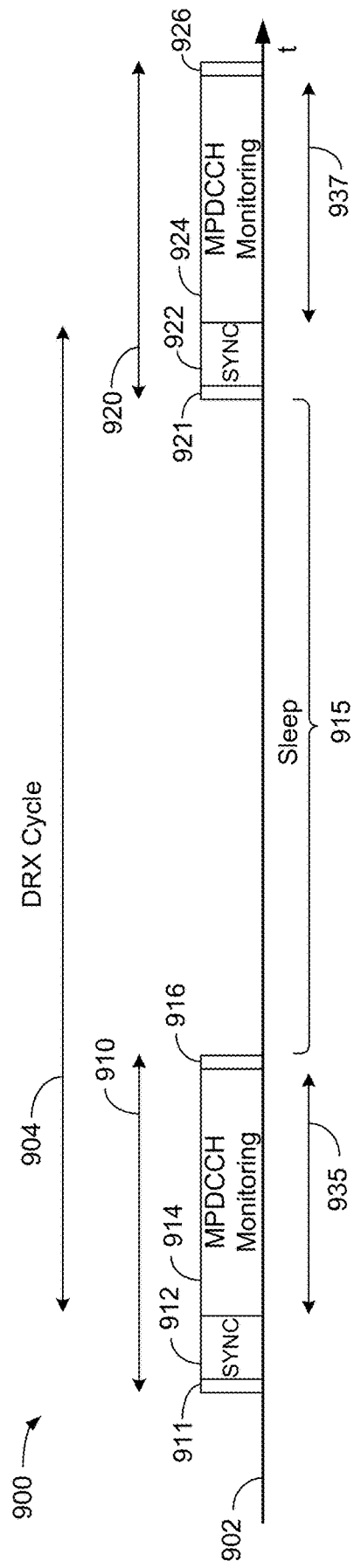
FIG. 9 is a diagram showing an exemplary embodiment of a conventional DRX cycle for a UE in idle mode.

FIG. 9 is a diagram 900 showing an exemplary embodiment of a conventional DRX cycle for a UE in idle mode.

The diagram 900 shows a timeline 902, and a DRX cycle 904. An exemplary total awake time for a receiver is shown using reference numeral 910. The total awake time comprises a warm up period 911, a synchronization (SYNC) period 912, a period 914 during which the receiver monitors the MTC physical downlink control channel (MPDCCH), and a ramp down period 916. Similarly, an exemplary total awake time for a receiver is also shown using reference numeral 920. The total awake time comprises a warm up period 921, a synchronization (SYNC) period 922, a period 924 during which the receiver monitors the MTC physical downlink control channel (MPDCCH), and a ramp down period 926. A sleep period 915 extends from the end of the ramp down period 916 to the beginning of the warm up period 921. In an exemplary embodiment, the MPDCCH monitoring period (also referred to as search space) 914 may occur within a paging transmission window (PTW) 935 and the MPDCCH monitoring period (also referred to as search space) 924 may occur in within a paging transmission window 937. Paging occasions from a base station, which may comprise transmissions of MPDCCH (or PDCCH) communications, may occur within the paging transmission window 935 and the paging transmission window 937. The UE monitors for a page from a base station in its paging transmission windows 935 and 937. The UE is in a sleep mode prior to its paging transmission window. The UE awakens slightly earlier than its paging transmission window to obtain timing/frequency synchronization and to reconfirm the serving cell. This is shown in FIG. 9 as the warm up period 911 and the SYNCH period 912 (and the warm up period 921 and SYNC period 922). Once the UE has timing/frequency synchronization, the UE monitors the MTC physical downlink control channel (MPDCCH) during periods 914 and 924, in this example. If there is no page (which is the case shown in FIG. 9), the UE then reenters sleep until the next paging transmission window. The amount of time the UE is awake includes the time for warm up, synchronization, time for monitoring MPDCCH, as well as ramp down time. Since the MPDCCH payload contains several bits, the time to decode the MPDCCH can span several 10s of subframes, particularly in scenarios where signal-to-noise ratio (SNR) is low.

In an exemplary embodiment, the awake time of the UE can be substantially reduced by sending, for example, a small communication, such as, for example, a "1-bit" or on an ON-OFF wake-up signal (WUS) that lets the UE know ahead of time whether the UE should fully awaken to monitor for an MPDCCH (or PDCCH, or NPDCCH) communication. For example, if an ON-OFF signal is used for the wake-up signal, the wake up signal could indicate the presence of the PDCCH (or MPDCCH, or NPDCCH) by the presence or absence of the wake-up signal.

Figure 10:
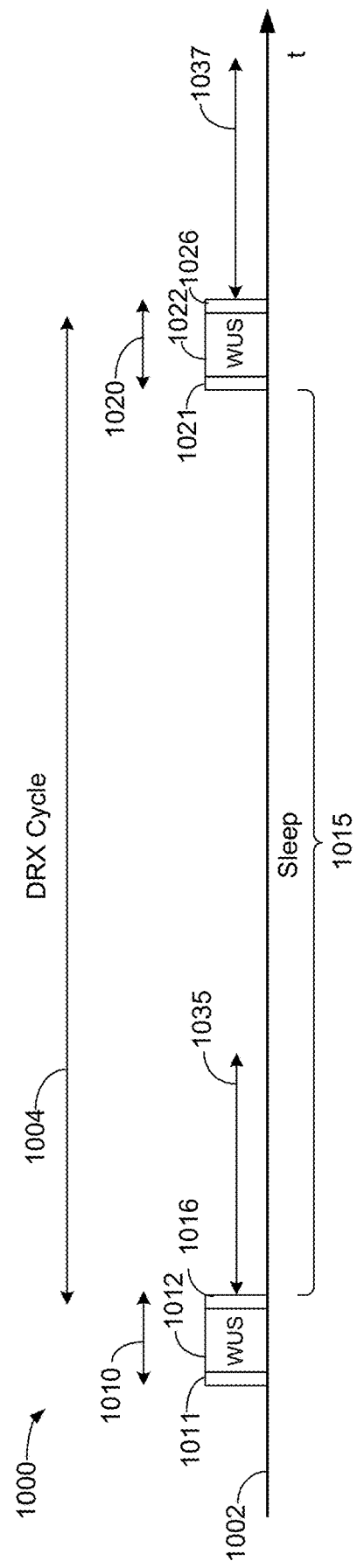
FIG. 10 is a diagram showing an exemplary embodiment of a DRX cycle for a UE in idle mode in which the UE may not awaken.

FIG. 10 is a diagram 1000 showing an exemplary embodiment of a DRX cycle for a UE in idle mode in which the UE may not awaken. The diagram 1000 shows a timeline 1002, and a DRX cycle 1004. An exemplary total awake time for a receiver is shown using reference numeral 1010. The total awake time comprises a warm up period 1011, a wake up signal monitoring period (also referred to as search space) 1012, and a ramp down period 1016. Similarly, an exemplary total awake time for a receiver is also shown using reference numeral 1020. The total awake time comprises a warm up period 1021, a wake up signal monitoring period (also referred to as search space) 1022, and a ramp down period 1026. A sleep period 1015 extends from the end of the ramp down period 1016 to the beginning of the warm up period 1021. In an exemplary embodiment, during the wake-up signal monitoring period 1012 and the wake-up signal monitoring period 1022, the UE synchronizes to the base station and monitors for a wake up signal. In this exemplary embodiment, if the UE does not detect the wake-up signal in the period 1012 or in the period 1022 (or the UE decodes a wake-up signal and the wake-up signal indicates that no MPDCCH (or PDCCH) is present), the UE returns to sleep mode immediately after the ramp down period 1016, or 1026, and does not remain awake to monitor the MPDCCH (or PDCCH) channel, such that the sleep period 1015 is longer than the sleep period 915 of FIG. 9. Since the length of the wake-up signal is expected to be much smaller than the length of the MPDCCH channel (as the wake-up signal effectively conveys many fewer bits) the time that the UE is awake is significantly reduced and hence the corresponding power consumption is reduced. As shown in FIG. 10, the paging transmission window 1035 and the paging transmission window 1037 do not include the UE monitoring the MPDCCH channel, such that the UE may remain in sleep mode during the paging transmission window 1035 and the paging transmission window 1037.

Figure 11:
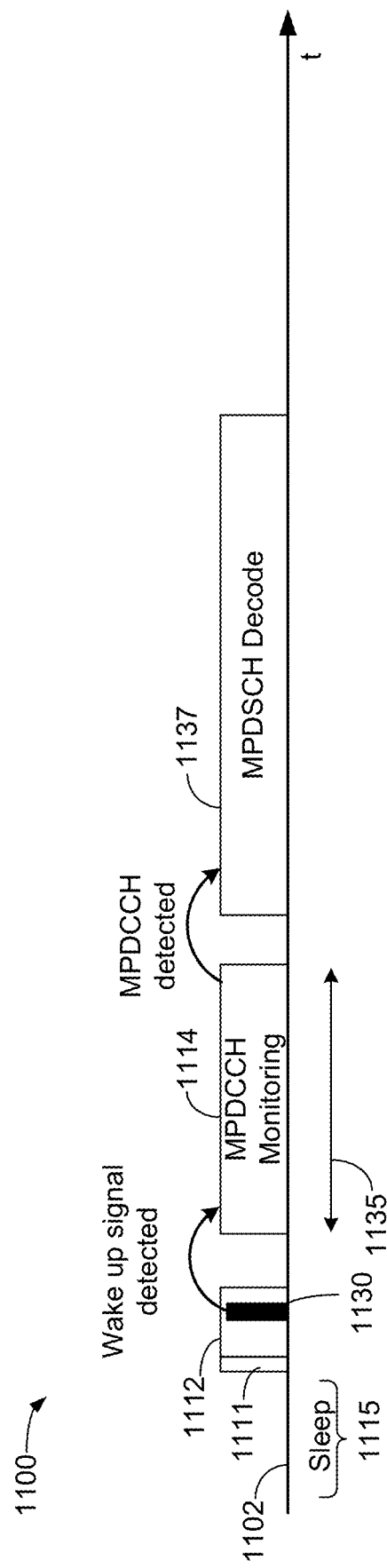
FIG. 11 is a diagram showing exemplary UE processing when a paging signal is sent to the UE.

FIG. 11 is a diagram 1100 showing exemplary UE processing when a paging signal is sent to the UE. In an exemplary embodiment, a timeline 1102 shows that a UE may be in a sleep mode during the time 1115 prior to a ramp up period 1111 and prior to receiving an exemplary wake up signal 1130 in the wake-up signal search space 1112. The ramp up period 1111 may comprise one or more signals, such as pilot signals (CRS/NRS/other pilot signals) that allow a UE to obtain timing and frequency synchronization with a base station. Once the wake-up signal 1130 is detected, the UE will monitor the MPDCCH channel 1114 during a paging transmission window 1135. The paging transmission window 1135 refers to a period of time that a base station may be "paging" the UE to awaken the UE so that the UE may receive a data transmission. Once an MPDCCH channel is detected, the UE may receive and decode the associated MTC PDSCH (MPDSCH) channel (data channel) 1137.

Figure 12:
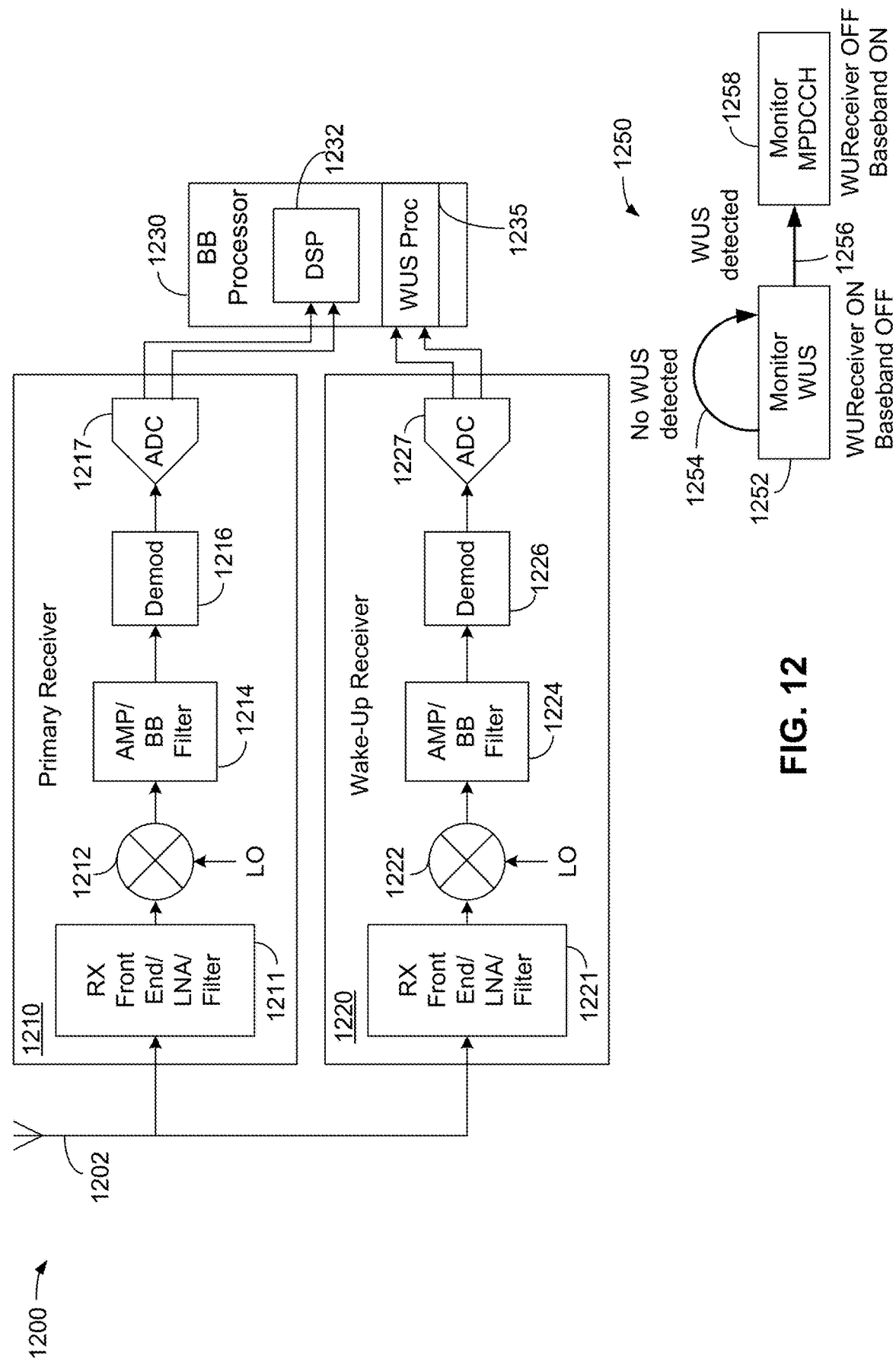
FIG. 12 is a diagram showing an exemplary receiver architecture including a primary receiver, a wake-up receiver, and a baseband processor.

FIG. 12 is a diagram 1200 showing an exemplary receiver architecture including a primary receiver 1210, a wake-up receiver 1220 and a baseband processor 1230. The depictions of the primary receiver 1210 and the wake-up receiver 1220 shown in FIG. 12 are intended to represent basic receiver architecture, with details of the primary receiver 1210 and the wake-up receiver 1220 being dependent on application. Those having ordinary skill in the art will recognize that the primary receiver 1210 and the wake-up receiver 1220 may take many different forms. In an exemplary embodiment, the primary receiver 1210 may comprise a receiver front end 1211, a downconverter 1212, an amplifier/baseband filter 1214, a demodulator 1216 and an analog-to-digital converter (ADC) 1217. In an exemplary embodiment, the receiver front end 1211 may comprise one or more of a filter and a low noise amplifier (LNA) configured to receive a radio frequency signal and amplify the received RF signal for further processing. In an exemplary embodiment, the downconverter 1212 may comprise circuitry configured to receive the output of the receiver front end 1211 and downconvert the RF signal using a local oscillator (LO) signal to either an intermediate frequency (IF) signal or to a baseband or near-baseband signal for further processing. In an exemplary embodiment, the amplifier/baseband filter 1214 may be configured to further amplify and/or filter the downconverted signal. In an exemplary embodiment, the demodulator 1216 may be configured to demodulate the received signal to recover the original information signal (the data). In an exemplary embodiment, the ADC 1217 may be configured to convert the analog signal from the demodulator 1216 to digital signals, such as in-phase (I) and quadrature (Q) digital signals representing the information signal. The output of the ADC 1217 may be provided to a baseband processor 1230 for further processing.

In an exemplary embodiment, the wake-up receiver 1220 may comprise a receiver front end 1221, a downconverter 1222, an amplifier/baseband filter 1224, a demodulator 1226 and an analog-to-digital converter (ADC) 1227. In an exemplary embodiment, the receiver front end 1221 may comprise one or more of a filter and a low noise amplifier (LNA) configured to receive a radio frequency signal and amplify the received RF signal for further processing. In an exemplary embodiment, the downconverter 1222 may comprise circuitry configured to receive the output of the receiver front end 1221 and downconvert the RF signal using a local oscillator (LO) signal to either an intermediate frequency (IF) signal or to a baseband or near-baseband signal for further processing. In an exemplary embodiment, the amplifier/baseband filter 1224 may be configured to further amplify and/or filter the downconverted signal. In an exemplary embodiment, the demodulator 1226 may be configured to demodulate the received signal to recover the original information signal (the data). In an exemplary embodiment, the ADC 1227 may be configured to convert the analog signal from the demodulator 1226 to digital signals, such as in-phase (I) and quadrature (Q) digital signals representing the information signal. The output of the ADC 1227 may be provided to the baseband processor 1230 for further processing.

In an exemplary embodiment, the baseband processor 1230 may comprise a digital signal processor 1232 and a wake-up signal (WUS) processor 1235. The DSP 1232 may be configured to perform one or more digital processing operations to convert the digital information signal received from the ADC 1217 to a usable data signal. In an exemplary embodiment, the WUS processor 1235 may be configured to perform one or more digital processing operations to convert the digital information signal received from the ADC 1227 to a signal that may be used to determine whether the receiver 1210 and the parts of the baseband processor 1230 not used for wake-up signal processing should be activated to process the received signal from the primary receiver 1210. In an exemplary embodiment, the wake-up receiver 1220 may comprise a separate receiver as shown in FIG. 12, or may comprise a portion of the primary receiver 1210 with processing capability tailored to process the wake-up signal 1130 (FIG. 11). Accordingly, the wake-up receiver 1220 may be efficient from a power consumption perspective because it need only process the very small (as small as one bit), wake-up signal. Further, because the wake-up signal may be very small, the portion of the baseband processor used to process the wake-up signal, i.e., the WUS processor 1235, may be small compared to the processing capability of the baseband processor 1230, and as such, significant portions of the baseband processor 1230 may be inactive and placed in a power saving state (i.e., a sleep state or sleep mode), when the WUS processor 1235 is processing the wake-up signal. In this manner, significant power savings can be achieved for a UE having the wake-up receiver 1220 because nearly all of the circuitry in the baseband processor 1230 may be inactive until it is determined by the wake-up receiver 1220 and WUS processor 1235 that there may be additional data destined for the UE in which the primary receiver 1210 and wake-up receiver 1220 may be located. In this manner, the primary receiver 1210 and significant portions of the baseband processor 1230 may remain in a power saving sleep mode until it is determined that there is received data to process.

The use of the wake-up signal (1130, FIG. 11) generally enables use of power efficient hardware architectures. For example, MPDCCH monitoring involves complex baseband processing but detection of the wake-up signal 1130, FIG. 11) is possible using the low power wake-up receiver (WUR) 1220. For example, the wake-up receiver 1220 may be configured to perform only correlations on the received signal to detect the presence of the wake-up signal 1130 (FIG. 11). In an exemplary embodiment, the wake-up receiver 1220 is operative only to detect the wake-up signal 1130 (FIG. 11). The full baseband processor 1230 is activated only when the wake-up signal 1130 (FIG. 11) is detected. This enables power savings in addition to the power savings obtained by reducing the awake time of the receiver. Note that the wake-up receiver 1220 and baseband processor 1230 shown in FIG. 12 is conceptual and there are a number of ways to realize the wake-up receiver 1220 in an actual hardware implementation, including operating wake-up signal detection as a low power mode functionality of the primary receiver 1210 and baseband processor 1230.

In FIG. 12, a state diagram 1250 may be used to further explain the operation of the wake-up receiver 1220 and baseband processor 1230. In state 1252, the wake-up receiver 1220 is active and monitoring for a wake-up signal. If no wake-up signal is detected in state 1254, the wake-up receiver 1220 and baseband processor 1230 remain in state 1252. When a wake-up signal is detected in state 1256, the wake-up receiver and WUS processor 1235 are deactivated, and the primary receiver 1210 and baseband processor 1230 are activated to monitor the MPDCCH channel in state 1258. There are a number of different exemplary embodiments for implementing the wake-up signal 1130 (FIG. 11) and the wake-up receiver 1220.

Figure 13:
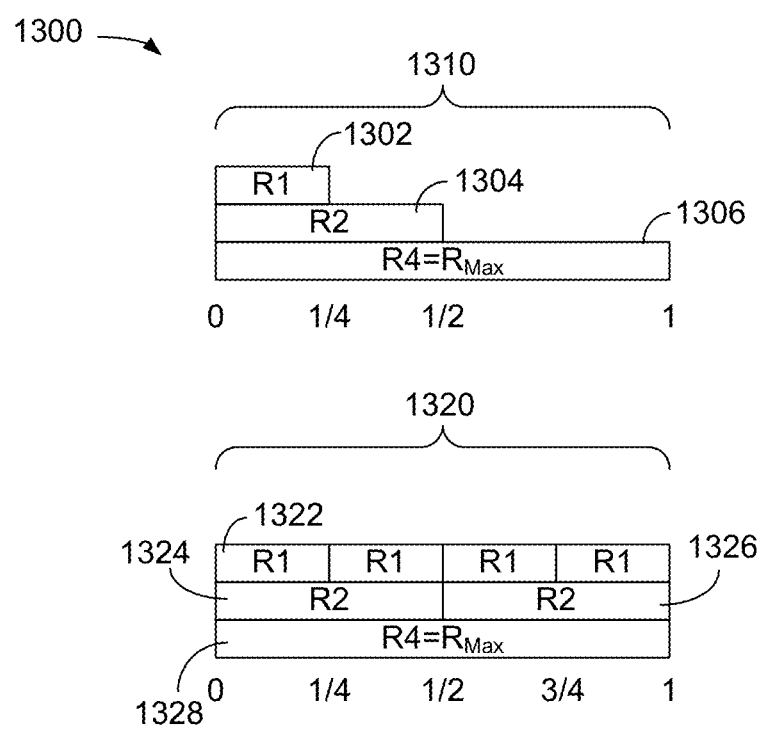
FIG. 13 is a diagram illustrating two options for wake-up signal search space according to certain aspects.

FIG. 13 is a diagram 1300 illustrating two possible exemplary options for wake-up signal search space. A wake-up signal search space may be configured in a manner similar to the manner in which a PDCCH (or NPDCCH or MPDCCH) search space is configured. In a first exemplary embodiment, for decoding a PDCCH (or NPDCCH or MPDCCH) communication, a UE may be configured with a search space where the PDCCH communication may be sent by a base station a maximum repetition number of times, referred to as Rmax. A UE may be similarly configured with a wake-up signal search space, where the wake-up signal may be sent by a base station also using the maximum repetition number of times, Rmax, to determine a wake-up signal search space. The actual number of repetitions used by the base station to send a wake-up signal may be smaller than Rmax. In an exemplary embodiment, the value of Rmax may be different for PDCCH and for the wake-up signal. In an exemplary embodiment, a UE searches the PDCCH, and may similarly search the wake-up signal, for all possible communication sizes that a base station can use to send the PDCCH, or the wake-up signal, and for different starting locations of the PDCCH, or the wake-up signal, within the search space that the base station is allowed to use. In a first exemplary embodiment, in FIG. 13, the combinations include a size R1 1302 starting at location 0 in the search space 1310, a size R2 1304 starting at location 0 in the search space 1310 and a size R4 1306 starting at location 0 in the search space 1310. Therefore, a UE may try three hypotheses for locating a PDCCH transmission and/or a wake-up signal transmission from a base station. In an alternative exemplary embodiment, in FIG. 13, a size R1 PDCCH 1322 (or wake-up signal) can be sent in one of four locations starting at location 0 in the search space 1320, a location ¼ of the way through the search space 1320, a location ½ of the way through the search space 1320, and a location that is ¾ way through the search space 1320. A size R2 PDCCH 1324 (or wake-up signal) can be sent starting at the beginning, location 0, of the search space 1320 a size R2 PDCCH 1326 (or wake-up signal) can be sent at a location ½ of the way through the search space 1320. A size R4 PDCCH 1328 (or wake-up signal) can only be sent starting at the beginning, location 0, of the search space 1320. Therefore, using the two exemplary embodiments described above, a UE may attempt seven (7) hypotheses for locating a PDCCH communication and/or a wake-up signal communication.

FIG. 14A, FIG. 14B, FIG. 14C and FIG. 14D are time line diagrams showing exemplary embodiments of synchronization signals and wake-up signals. FIG. 14A shows a diagram 1400 showing an embodiment of a UE timeline 1402 that shows a legacy synchronization signal search space 1404 having one or more legacy synchronization signals 1406, and a wake-up signal search space 1410 having one or more wake-up signals 1415 in accordance with an exemplary embodiment of the disclosure.

FIG. 14B shows a diagram 1420 showing an embodiment of a UE timeline 1422 that shows a synchronization signal search space 1425 in accordance with an exemplary embodiment of the disclosure. The synchronization signal search space 1425 may have one or more modified synchronization signals 1427 in accordance with an exemplary embodiment of the disclosure. The timeline 1422 also comprises a wake-up signal search space 1430 having one or more wake-up signals 1435 in accordance with an exemplary embodiment of the disclosure. Synchronizing a UE using legacy synchronization signals, such as shown in FIG. 14A, may be time consuming for at least the reason that the legacy synchronization signals are distant from each other, in that they are spaced relatively far apart. A modified synchronization signal 1427, described below, may have characteristics enabling improved wake-up scenarios. In some arrangements, a modified synchronization signal may be more dense in time than legacy synchronization signals and/or may also have a longer period between signals, as will be described below. The terms "more dense in time" and "dense in time" may refer to a new synchronization signal, which may be a modified synchronization signal, a PBCH communication, a synchronization signal communication, a SIB communication, or another communication signal or channel, that occurs having a repetition rate that repeats over smaller period of time than other synchronization signals. The terms "longer period between signals" and "longer period" may refer to a new, or modified, synchronization signal, which may be a modified synchronization signal, a PBCH communication, a synchronization signal communication, a SIB communication, or another communication signal or channel, that occurs periodically with a period of time between repetitions being longer in time than other synchronization signals.

FIG. 14C shows a diagram 1440 showing an embodiment of a UE timeline 1442 that shows a synchronization signal search space 1445 in accordance with an exemplary embodiment of the disclosure. The synchronization signal search space 1445 may have one or more modified synchronization signals 1447 in accordance with an exemplary embodiment of the disclosure. The one or more modified synchronization signals 1447 may be similar to the one or more modified synchronization signals 1427 of FIG. 14B.

The timeline 1442 also comprises a wake-up signal search space 1452, but in this exemplary embodiment, no wake-up signal is sent. In this exemplary embodiment, the modified synchronization signals 1447 may be sent without the presence of a wake-up signal.

FIG. 14D shows a diagram 1460 showing an embodiment of a UE timeline 1462 that shows a wake-up signal search space 1470 having one or more wake-up signals 1465 in accordance with an exemplary embodiment of the disclosure. In this exemplary embodiment, the one more wake-up signals 1465 may serve as both a synchronization signal and as a wake-up signal.

Synchronizing using legacy synchronization signals (FIG. 14A) may comprise using narrowband PSS (NPSS)/narrowband SSS (NSSS)/CRS/NRS for narrowband IoT (NB-IoT), and PSS/SSS/CRS for eMTC. For NB-IoT using NPSS/NSSS is generally sufficient. For eMTC, using the CRS will likely be more efficient. Enhancements for eMTC search may introduce other options for synchronization, which may be easier to use for wake-up receiver dedicated hardware than CRS as using CRS may involve use of fast Fourier transforms (FFTs) and other complex signal processing elements. In an exemplary embodiment, the wake-up receiver 1200 may be configured to monitor a modified synchronization channel, and process a modified synchronization signal and/or a wake-up signal, which may be computationally more simple to process than a legacy synchronization signal. Further, the processing of a modified synchronization signal uses fewer hardware processing resources because when processing a modified synchronization signal, the wake-up receiver 1200 may be active for a shorter period of time than when processing a legacy synchronization signal.

Figure 15:
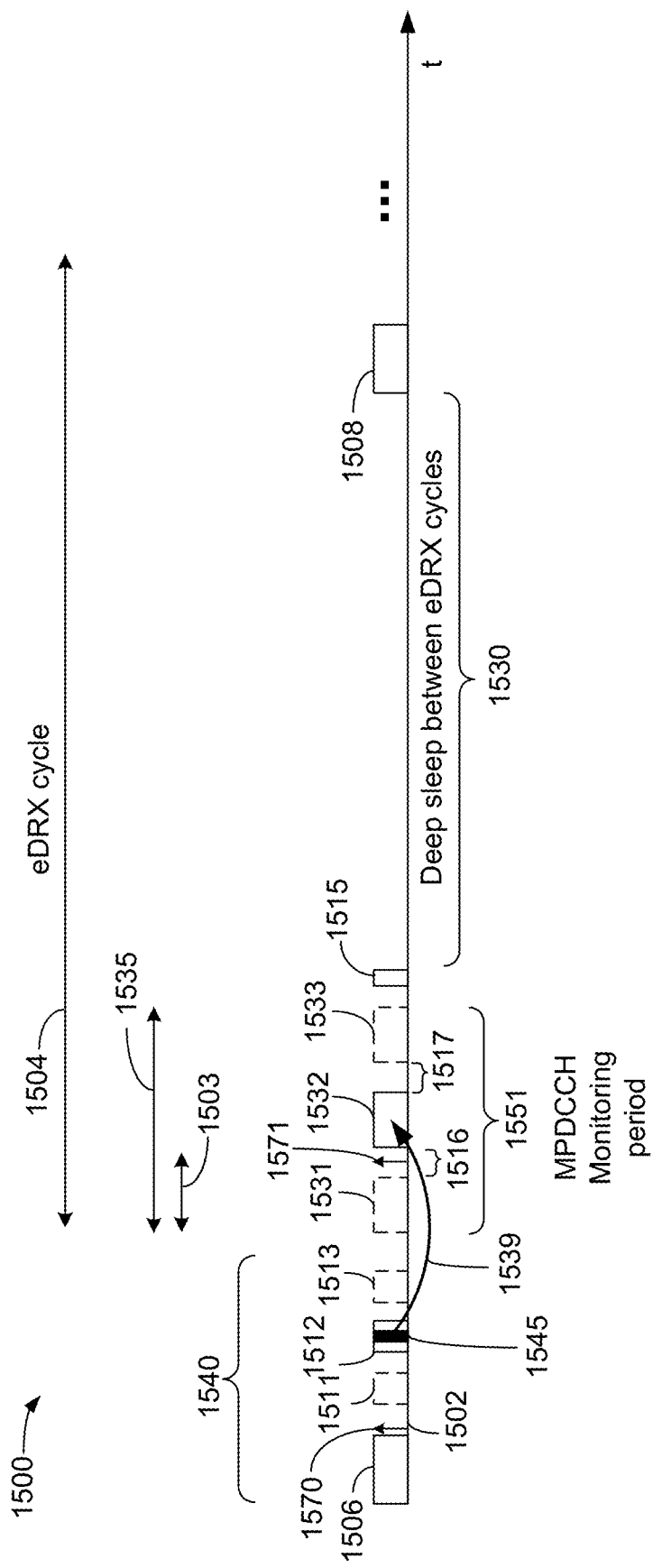
FIG. 15 is a diagram showing an exemplary embodiment of a wake-up signal implementation that uses a common synchronization portion for a plurality of UE groups and a wake-up signal portion that may be different for the different UE groups.

FIG. 15 is a diagram 1500 showing an exemplary embodiment of a wake-up signal implementation that uses a common synchronization portion for a plurality of UE groups and a wake-up signal portion that may be different for the different UE groups. In an exemplary embodiment, the eDRX cycle 1504 is shown on a UE timeline 1502. A wake-up period 1506 occurs during which time a UE awakens from a deep sleep period. In this exemplary embodiment, during the wake-up period 1506, a wake-up receiver, such as the wake-up receiver 1220 in FIG. 12, may be used to monitor for a wake-up signal. In an exemplary embodiment the UE may load its full software (SW) image files, or a partial set of SW image files, and may perform other functions that allow it to awaken and monitor for a wake-up signal.

In an exemplary embodiment, the UE may synchronize to a base station during the time period 1506 using existing synchronization signals, thus minimizing overhead. Existing synchronization signals may be more powerful than a wake-up signal (for example NB-IoT anchor carrier signals). In an exemplary embodiment, since the wake-up signal is transmitted relatively infrequently, legacy signals may be used for synchronization, for cell confirmation/TTL/FTL, etc. In an exemplary embodiment, a synchronization process may be subsampled—for example, a synchronization process may be performed only once for every four (4) times that UE awakens to monitor the PDCCH, etc.

In this exemplary embodiment, the wake-up receiver 1220 may monitor for a wake-up signal during an exemplary time period 1540. The time period 1540 may be referred to as a wake-up signal search space, or a wake-up signal monitoring window, during which a wake-up receiver (WUR) communication may be transmitted by a base station to a subject UE. A wake-up receiver communication may include one or more of a wake-up signal, a synchronization signal, or another communication In an exemplary embodiment, the time period 1540 comprises the time available to a base station for sending one or more wake-up signals to a UE. If more than one wake-up signal is sent during the time period 1540, then the time period 1540 also includes any time between wake-up signals, and/or wake-up signal search spaces.

In this exemplary embodiment, the time period 1540 may comprise a common wake-up period 1506 during which synchronization signals are always sent (i.e., synchronization signals are sent even when the wake-up signal is not sent as the UE may not have a corresponding PDCCH (or MPDCCH)), and may include one or more synchronization signals that allow the UE to synchronize to a base station. In another exemplary embodiment, a synchronization signal is sent only when a wake-up signal is sent. When a synchronization signal is only sent with a wake-up signal, the synchronization signal may be a separate synchronization signal or the wake-up signal may serve as the synchronization signal.

In this exemplary embodiment, the wake-up period 1506 may be common to a plurality of wake-up signal search spaces, with three exemplary wake-up signal search spaces 1511, 1512 and 1513 shown for illustrative purposes only. Each of the wake-up signal search spaces 1511, 1512 and 1513 may be associated with, or related to, a particular UE group. A UE group may comprise one or more UEs. In this example, the wake-up signal search space 1511 may be associated with UE group 1, the wake-up signal search space 1512 may be associated with UE group 2, and the wake-up signal search space 1513 may be associated with UE group 3.

In an exemplary embodiment, the monitoring for the wake-up signal may be decoupled from the synchronization timing. For example, it may be preferable to perform synchronization once every "N" wake-up signal monitoring occasions.

In an exemplary embodiment, each wake-up signal search space may be associated with a corresponding MPDCCH (or PDCCH) monitoring window, or search space, during which a UE or a UE group may monitor for a MPDCCH (or a PDCCH) communication. In an exemplary embodiment, three exemplary MPDCCH (or PDCCH) search spaces 1531, 1532 and 1533 shown for illustrative purposes only. In this exemplary embodiment, the MPDCCH (or PDCCH) monitoring window 1531 corresponds to the wake-up signal search space 1511, the MPDCCH (or PDCCH) monitoring window 1532 corresponds to the wake-up signal search space 1512, and the MPDCCH (or PDCCH) monitoring window 1533 corresponds to the wake-up signal search space 1513.

In this exemplary embodiment, a wake-up signal 1545 is detected by the UE during the wake-up signal search space 1512, and as a result of detecting the wake-up signal 1545, the UE then begins to monitor the MPDCCH (or PDCCH) channel in corresponding MPDCCH (or PDCCH) search space 1532, as shown by arrow 1539. In an exemplary embodiment, the length of the time period 1540 may be configured during the RRC establishment, or may be determined based on Rmax/TxD/DRX cycle, etc. In an exemplary embodiment, depending on the design selected for wake-up signal implementation, timing/frequency synchronization may be performed using the wake-up signal 1545, or one or more pilot signals prior to monitoring the wake-up signal. The monitoring period for the timing/frequency synchronization signals may be at least part of a receiver implementation so it may not be predefined in the specification. The length of the wake-up signal may be predefined.

In an exemplary embodiment, one or more pilot signals, an exemplary one of which is shown using reference numeral 1570, may be located in one or more of the vicinity of a wake-up signal, and the vicinity of an MPDCCH (or PDCCH) communication. In an exemplary embodiment, a pilot signal 1570 is always located in the vicinity of a wake-up signal regardless of whether the wake-up signal is actually sent. In an exemplary embodiment, a pilot signal 1570 is sent in the vicinity of the wake-up signal only when the wake-up signal is transmitted. In an exemplary embodiment, a pilot signal 1571 may be located in a vicinity of the MPDCCH (or PDCCH) communication only when the wake-up signal is sent. In an exemplary embodiment, the density (i.e., the number) of pilot signals may be increased in the vicinity of a wake-up signal. As used herein, the term "vicinity" as in the pilot signal 1570 being located in the "vicinity" of a wake-up signal or the pilot signal 1571 being located in the "vicinity" of an MPDCCH (or PDCCH) communication may refer to the pilot signal 1570 being located in the time period 1540, and/or a pilot signal 1571 being located in a paging transmission window 1535.

In an exemplary embodiment, a wake-up signal may be sent during one of the wake-up signal search spaces 1511, 1512 and/or 1513 only when an MPDCCH (or PDCCH) communication for that UE group is present. In this example, the wake-up signal 1545 is sent because there is an MPDCCH (or PDCCH) communication in the search space 1532 for UE group 2.

After the wake-up signal 1545 is detected and after the search space 1540, the paging transmission window 1535 begins, during which the UE is awake and monitoring an MPDCCH ((or PDCCH) channel (in search space 1532 in this example) to determine whether a base station has any information destined for that UE or UE group, and during which the UE or UE group may decode the MPDCCH (or PDCCH) channel to alert a base station that the UE may have information to transmit to the base station. In this exemplary embodiment, the paging transmission window 1535 may comprise a number of MPDCCH or PDCCH monitoring periods, such as monitoring periods 1531, 1532 and 1533, and the spacing between the MPDCCH or PDCCH monitoring periods, with MPDCCH or PDCCH monitoring periods 1531, 1532, and 1533, and time periods 1516 and 1517 shown as illustrative examples only of monitoring period 1551. After the MPDCCH or PDCCH monitoring periods, the paging transmission window 1535 concludes with a ramp-down period 1515, during which time the UE ramps down and reenters a deep sleep state 1530 until another wake-up period 1508 occurs and the process may repeat. In an exemplary embodiment, the paging transmission window 1535 also includes an exemplary DRX cycle 1503, which may include one MPDCCH or PDCCH monitoring period 1531 followed by a time period 1516 where the UE may enter a light sleep state. Similarly, another DRX cycle may comprise the MPDCCH or PDCCH monitoring period 1532, which may be followed by a time period 1517 where the UE may enter a light sleep state. Light sleep may also occur in a DRX cycle comprising the last MPDCCH or PDCCH monitoring period 1533 and the ramp-down period 1515.

In an exemplary embodiment, a synchronization signal sent in a synchronization channel during the time period 1506 may be used to obtain timing synchronization and broadcast parameters of the system. A wake up signal may be sent to reduce the power expended by a UE on monitoring for a PDCCH. Instead of a UE always monitoring the PDCCH even though it may not have any PDCCH communication destined for it, a wake-up signal requiring significantly less UE power to monitor than the UE expends monitoring the PDCCH allows a UE to skip monitoring the PDCCH if there is no data destined for the UE in the current subframe.

Figure 16:
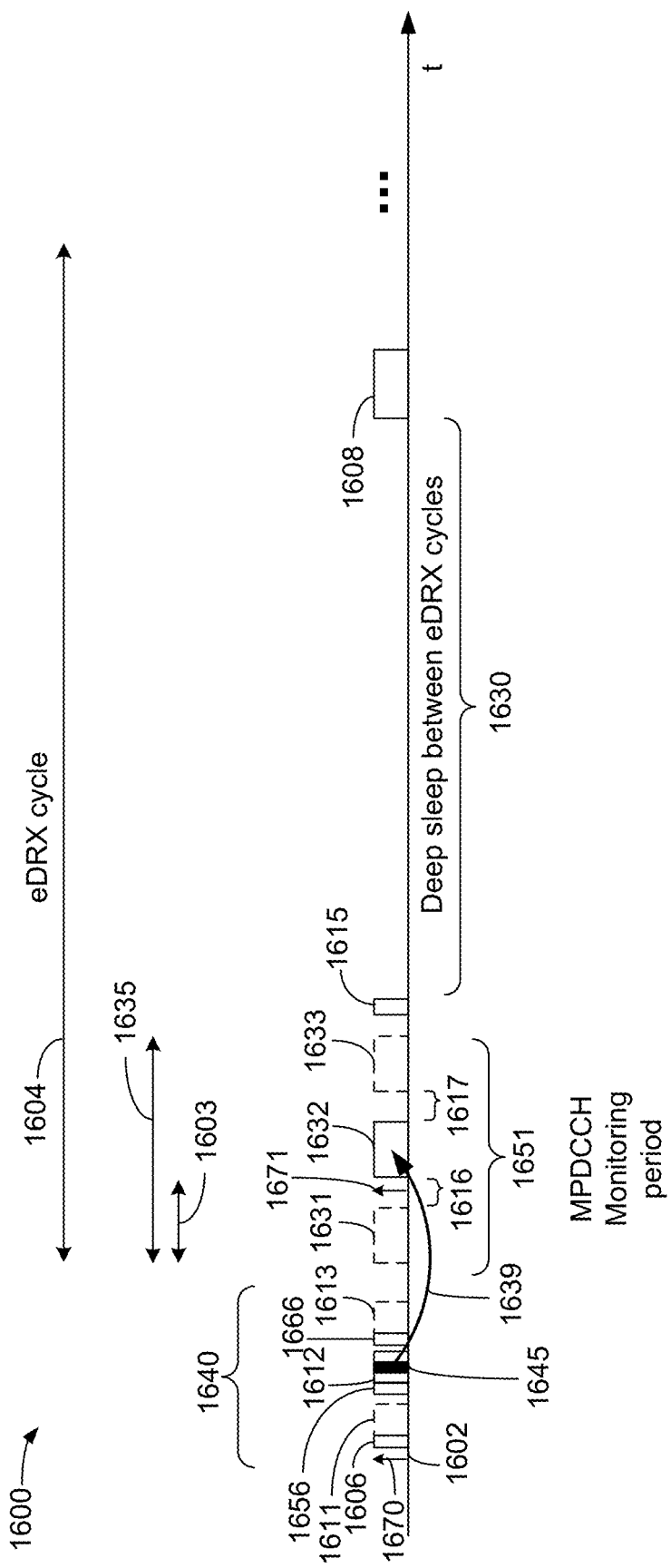
FIG. 16 is a diagram showing an exemplary embodiment of a wake-up signal implementation that uses a synchronization portion and a wake-up signal portion for each of a plurality of UE groups.

FIG. 16 is a diagram 1600 showing an exemplary embodiment of a wake-up signal implementation that uses a synchronization portion and a wake-up signal portion for each of a plurality of UE groups. In an exemplary embodiment, the eDRX cycle 1604 is shown on a UE timeline 1602. A wake-up period 1606 occurs during which time a UE awakens from a deep sleep period. In this exemplary embodiment, during the wake-up period 1606, a wake-up receiver, such as the wake-up receiver 1220 in FIG. 12, may be used to monitor for a wake-up signal. In an exemplary embodiment the UE may load its full software (SW) image files, or a partial set of SW image files, and may perform other functions that allow it to awaken and monitor for a wake-up signal. In this exemplary embodiment, the wake-up receiver 1220 may monitor for a wake-up signal during an exemplary time period 1640. The time period 1640 may be referred to as a wake-up signal search space, or a wake-up signal monitoring window. The time period 1640 comprises the time available to a base station for sending one or more wake-up signals to a UE. If more than one wake-up signal is sent during the time period 1640, then the time period 1640 also includes any time between wake-up signals, and/or wake-up signal search spaces.

In this exemplary embodiment, the wake-up period 1606 may comprise one or more synchronization signals that allow the UE to synchronize to a base station and may be associated with a wake-up signal monitoring period, or search space 1611.

Similarly, in this exemplary embodiment, a wake-up period 1656 may comprise one or more synchronization signals that allow the UE to synchronize to a base station and may be associated with a wake-up signal monitoring period, or search space 1612; and, in this exemplary embodiment, a wake-up period 1666 may comprise one or more synchronization signals that allow the UE to synchronize to a base station and may be associated with a wake-up signal monitoring period, or search space 1613.

In this exemplary embodiment, the wake-up periods 1606, 1656 and 1666 are associated with wake-up signal search spaces 1611, 1612 and 1613, respectively.

Each of the wake-up periods 1606, 1656 and 1666 and associated wake-up signal search spaces 1611, 1612 and 1613, respectively, may be associated with, or related to, a particular UE group. A UE group may comprise one or more UEs. In this example, the wake-up period 1606 and the wake-up signal search space 1611 may be associated with UE group 1, the wake-up period 1656 and the wake-up signal search space 1612 may be associated with UE group 2, and the wake-up period 1666 and the wake-up signal search space 1613 may be associated with UE group 3.

In an exemplary embodiment, each wake-up signal search space may be associated with a corresponding MPDCCH (or PDCCH) monitoring window, or search space, during which a UE or a UE group may monitor for a MPDCCH (or a PDCCH) communication. In an exemplary embodiment, three exemplary MPDCCH (or PDCCH) search spaces 1631, 1632 and 1633 shown for illustrative purposes only. In this exemplary embodiment, the MPDCCH (or PDCCH) monitoring window 1631 corresponds to the wake-up signal search space 1611, the MPDCCH (or PDCCH) monitoring window 1632 corresponds to the wake-up signal search space 1612, and the MPDCCH (or PDCCH) monitoring window 1633 corresponds to the wake-up signal search space 1613.

In this exemplary embodiment, a wake-up signal 1645 is detected by the UE during the wake-up signal search space 1612, and as a result of detecting the wake-up signal 1645, the UE then begins to monitor the MPDCCH (or PDCCH) channel in corresponding MPDCCH (or PDCCH) search space 1632, as shown by arrow 1639. In an exemplary embodiment, the length of the time period 1640 may be configured during the RRC establishment, or may be determined based on Rmax/TxD/DRX cycle, etc. In an exemplary embodiment, depending on the design selected for wake-up signal implementation, timing/frequency synchronization may be performed using the wake-up signal 1645, or one or more pilot signals prior to monitoring the wake-up signal. The monitoring period for the timing/frequency synchronization signals may be at least part of a receiver implementation so it may not be predefined in the specification. The length of the wake-up signal may be predefined.

The period and configuration of the synchronization part (such as 1606) could be different from the configuration of the wake-up signal part (such as the wake-up signal search space 1612). In an exemplary embodiment, a synchronization part (such as 1606) is always sent, independent of whether the wake-up signal is sent. In another exemplary embodiment, the synchronization part (such as 1606) is sent only when the wake-up signal part (such as 1645) is sent. When neither a synchronization part (such as in 1606) nor a wake-up signal part (such as 1645) is sent, a UE may still synchronize using legacy signals.

Synchronizing using modified synchronization signals may be more power efficient as there is no need to monitor both legacy signals and the modified signals. Typically, cell reselection requirements are coupled with DRX cycle lengths and decoupling them may be beneficial when using new (modified) synchronizing signals.

In an exemplary embodiment, one or more pilot signals, an exemplary one of which is shown using reference numeral 1670, may be located in one or more of the vicinity of a wake-up signal, and the vicinity of an MPDCCH (or PDCCH) communication. In an exemplary embodiment, a pilot signal 1670 is always located in the vicinity of a wake-up signal regardless of whether the wake-up signal is actually sent. In an exemplary embodiment, a pilot signal 1670 is sent in the vicinity of the wake-up signal only when the wake-up signal is transmitted. In an exemplary embodiment, a pilot signal 1671 may be located in a vicinity of the MPDCCH (or PDCCH) communication only when the wake-up signal is sent. In an exemplary embodiment, the density (i.e., the number) of pilot signals may be increased in the vicinity of a wake-up signal. As used herein, the term "vicinity" as in the pilot signal 1670 being located in the vicinity of a wake-up signal or the pilot signal 1671 being located in the vicinity of an MPDCCH (or PDCCH) communication may refer to the pilot signal 1670 being located in the time period 1640, and/or a pilot signal 1671 being located in a paging transmission window 1635.

In an exemplary embodiment, a wake-up signal may be sent during one of the wake-up signal search spaces 1611, 1612 and/or 1613 only when an MPDCCH (or PDCCH) communication for that UE group is present. In this example, the wake-up signal 1645 is sent because there is an MPDCCH (or PDCCH) communication in the search space 1632 for UE group 2.

After the wake-up signal 1645 is detected and after the search space 1640, the paging transmission window 1635 begins, during which the UE is awake and monitoring an MPDCCH ((or PDCCH) channel (in search space 1632 in this example) to determine whether a base station has any information destined for that UE or UE group, and during which the UE or UE group may decode the MPDCCH (or PDCCH) channel to alert a base station that the UE may have information to transmit to the base station. In this exemplary embodiment, the paging transmission window 1635 may comprise a number of MPDCCH or PDCCH monitoring periods, such as monitoring periods 1631, 1632 and 1633, and the spacing between the MPDCCH or PDCCH monitoring periods, with MPDCCH or PDCCH monitoring periods 1631, 1632, and 1633, and time periods 1616 and 1617 shown as illustrative examples only of monitoring period 1651. After the MPDCCH or PDCCH monitoring periods, the paging transmission window 1635 concludes with a ramp-down period 1615, during which time the UE ramps down and reenters a deep sleep state 1630 until another wake-up period 1608 occurs and the process may repeat. The paging transmission window 1635 also includes an exemplary DRX cycle 1603, which may include one MPDCCH or PDCCH monitoring period 1631 followed by a time period 1616 where the UE may enter a light sleep state. Similarly, another DRX cycle may comprise the MPDCCH or PDCCH monitoring period 1632, which may be followed by a time period 1617 where the UE may enter a light sleep state. Light sleep may also occur in a DRX cycle comprising the last MPDCCH or PDCCH monitoring period 1633 and the ramp-down period 1615.

Figure 17:
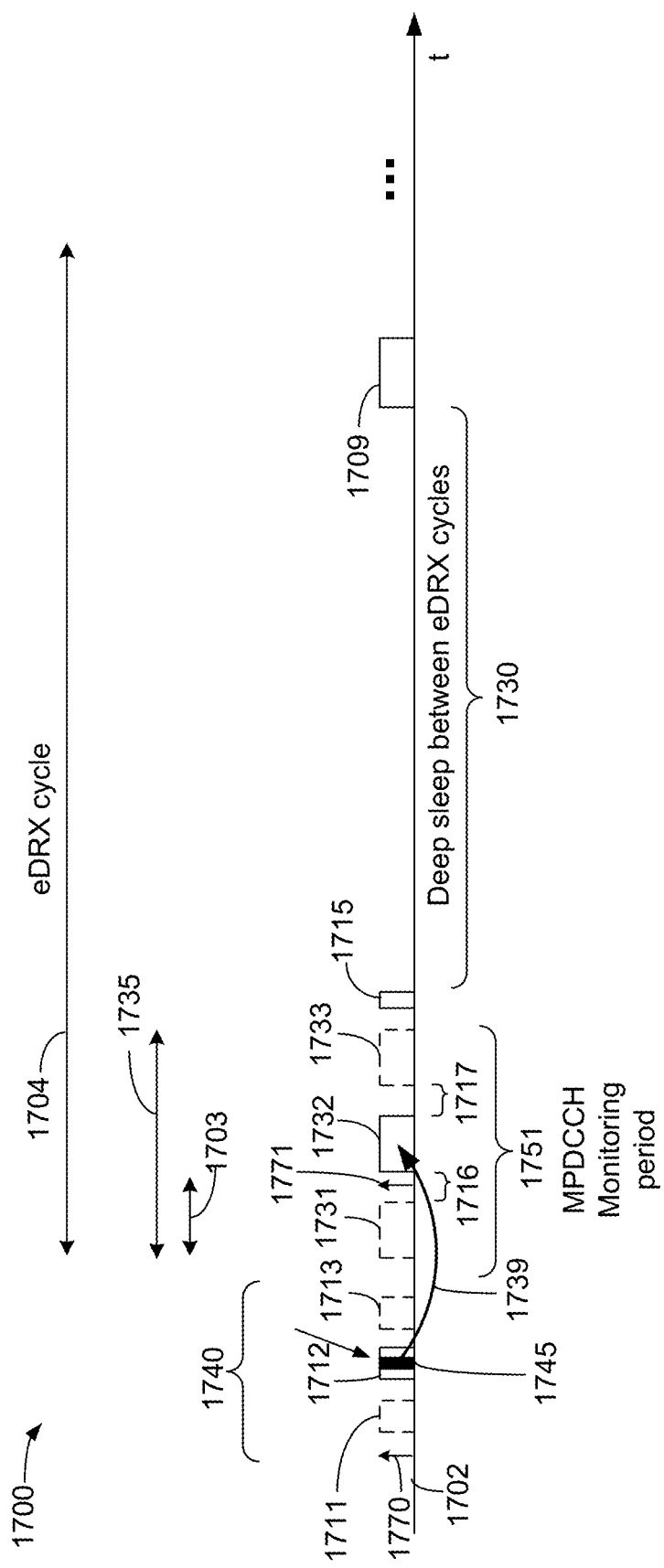
FIG. 17 is a diagram showing an exemplary embodiment of a wake-up signal implementation that uses only a wake-up signal for each of a plurality of UE groups.

FIG. 17 is a diagram 1700 showing an exemplary embodiment of a wake-up signal implementation that uses only a wake-up signal portion for each of a plurality of UE groups.

In an exemplary embodiment, the eDRX cycle 1704 is shown on a UE timeline 1702. In this exemplary embodiment, no separate wake-up period may occur and, in an exemplary embodiment, a UE may awaken and synchronize using a wake-up signal, and may detect the wake-up signal without synchronizing to a base station, and may then use the wake-up signal to synchronize to a base station. Alternatively, a UE may use a legacy synchronization signal, such as the synchronization signal 912 of FIG. 9, to synchronize to a base station and then monitor for a wake-up signal. Alternatively, once the UE is synchronized to a base station by using the wake-up signal for synchronization, the UE may then use a legacy synchronization channel to further refine its synchronization with a base station.

In this exemplary embodiment, during the wake-up signal search space 1711, a wake-up receiver, such as the wake-up receiver 1220 in FIG. 12, may be used to monitor for a wake-up signal. In an exemplary embodiment the UE may load less than all of its full software (SW) image files, for example, a partial set of SW image files, and may perform other functions that allow it to awaken and monitor for a wake-up signal. In this exemplary embodiment, the wake-up receiver 1220 may monitor for a wake-up signal during an exemplary time period 1740. The time period 1740 may be referred to as a wake-up signal search space, or a wake-up signal monitoring window. The time period 1740 comprises the time available to a base station for sending one or more wake-up signals to a UE. If more than one wake-up signal is sent during the time period 1740, then the time period 1740 also includes any time between wake-up signals, and/or wake-up signal search spaces.

In an exemplary embodiment, each wake-up signal search space may be associated with a corresponding MPDCCH (or PDCCH) monitoring window, or search space, during which a UE or a UE group may monitor for a MPDCCH (or a PDCCH) communication. In an exemplary embodiment, three exemplary MPDCCH (or PDCCH) search spaces 1731, 1732 and 1733 shown for illustrative purposes only. In this exemplary embodiment, the MPDCCH (or PDCCH) monitoring window 1731 corresponds to the wake-up signal search space 1711, the MPDCCH (or PDCCH) monitoring window 1732 corresponds to the wake-up signal search space 1712, and the MPDCCH (or PDCCH) monitoring window 1733 corresponds to the wake-up signal search space 1713.

In this exemplary embodiment, a wake-up signal 1745 is detected by the UE during the wake-up signal search space 1712, and as a result of detecting the wake-up signal 1745, the UE synchronizes to the base station using the wake-up signal 1745 then begins to monitor the MPDCCH (or PDCCH) channel in corresponding MPDCCH (or PDCCH) search space 1732, as shown by arrow 1739. In an exemplary embodiment, the length of the time period 1740 may be configured during the RRC establishment, or may be determined based on Rmax/TxD/DRX cycle etc. In an exemplary embodiment, depending on the design selected for wake-up signal implementation, timing/frequency synchronization may be performed using the wake-up signal 1745, or one or more pilot signals prior to monitoring the wake-up signal. The monitoring period for the timing/frequency synchronization signals may be at least part of a receiver implementation so it may not be predefined in the specification. The length of the wake-up signal may be predefined.

In an exemplary embodiment, one or more pilot signals, an exemplary one of which is shown using reference numeral 1770, may be located in one or more of the vicinity of a wake-up signal, and the vicinity of an MPDCCH (or PDCCH) communication. In an exemplary embodiment, a pilot signal 1770 is always located in the vicinity of a wake-up signal regardless of whether the wake-up signal is actually sent. In an exemplary embodiment, a pilot signal 1770 is sent in the vicinity of the wake-up signal only when the wake-up signal is transmitted. In an exemplary embodiment, a pilot signal 1771 may be located in a vicinity of the MPDCCH (or PDCCH) communication only when the wake-up signal is sent. In an exemplary embodiment, the density (i.e., the number) of pilot signals may be increased in the vicinity of a wake-up signal. As used herein, the term "vicinity" as in the pilot signal 1770 being located in the vicinity of a wake-up signal or the pilot signal 1771 being in the vicinity of an MPDCCH (or PDCCH) communication may refer to the pilot signal 1770 being located in the time period 1740, and/or a pilot signal 1771 being located in a paging transmission window 1735.

In an exemplary embodiment, a wake-up signal may be sent during one of the wake-up signal search spaces 1711, 1712 and/or 1713 only when an MPDCCH (or PDCCH) communication for that UE group is present. In this example, the wake-up signal 1745 is sent because there is an MPDCCH (or PDCCH) communication in the search space 1732 for UE group 2.

After the wake-up signal 1745 is detected and after the search space 1740, the paging transmission window 1735 begins, during which the UE is awake and monitoring an MPDCCH ((or PDCCH) channel (in search space 1732 in this example) to determine whether a base station has any information destined for that UE or UE group, and during which the UE or UE group may decode the MPDCCH (or PDCCH) channel to alert a base station that the UE may have information to transmit to the base station. In this exemplary embodiment, the paging transmission window 1735 may comprise a number of MPDCCH or PDCCH monitoring periods, such as monitoring periods 1731, 1732 and 1733, and the spacing between the MPDCCH or PDCCH monitoring periods, with MPDCCH or PDCCH monitoring periods 1731, 1732, and 1733, and time periods 1716 and 1717 shown as illustrative examples only of monitoring period 1751. After the MPDCCH or PDCCH monitoring periods, the paging transmission window 1735 concludes with a ramp-down period 1715, during which time the UE ramps down and reenters a deep sleep state 1730 until another wake-up period 1708 occurs and the process may repeat. The paging transmission window 1735 also includes an exemplary DRX cycle 1703, which may include one MPDCCH or PDCCH monitoring period 1731 followed by a time period 1716 where the UE may enter a light sleep state. Similarly, another DRX cycle may comprise the MPDCCH or PDCCH monitoring period 1732, which may be followed by a time period 1717 where the UE may enter a light sleep state. Light sleep may also occur in a DRX cycle comprising the last MPDCCH or PDCCH monitoring period 1733 and the ramp-down period 1715.

In an exemplary embodiment, at least a part of a wake-up signal is always sent to the UE. In another exemplary embodiment, a wake-up signal is not always sent to a UE. For example, part or all of a wake-up signal may be sent only when there is a corresponding PDCCH (or MPDCCH) present. An advantage of always sending some or all of a wake-up signal to a UE is that the UE can perform synchronization (obtain TTL/FTL estimates) using the wake-up signal. Since the length of the wake-up signal could be different for different Rmax (maximum number of repetitions of the PDCCH), always sending the wake-up signal corresponding to the worst case Rmax will incur very high overhead.

The part of the wake-up signal that is always sent could correspond to a small Rmax. This would incur less overhead as it is not targeted for a worst case signal to noise ratio (SNR). A UE at high SNR can synchronize using the wake-up signal and can avoid monitoring legacy synchronization channels. A UE at a low SNR (that is, a SNR below a threshold) can synchronize using a combination of the new wake-up signal and legacy or modified synchronization signals.

Figure 18:
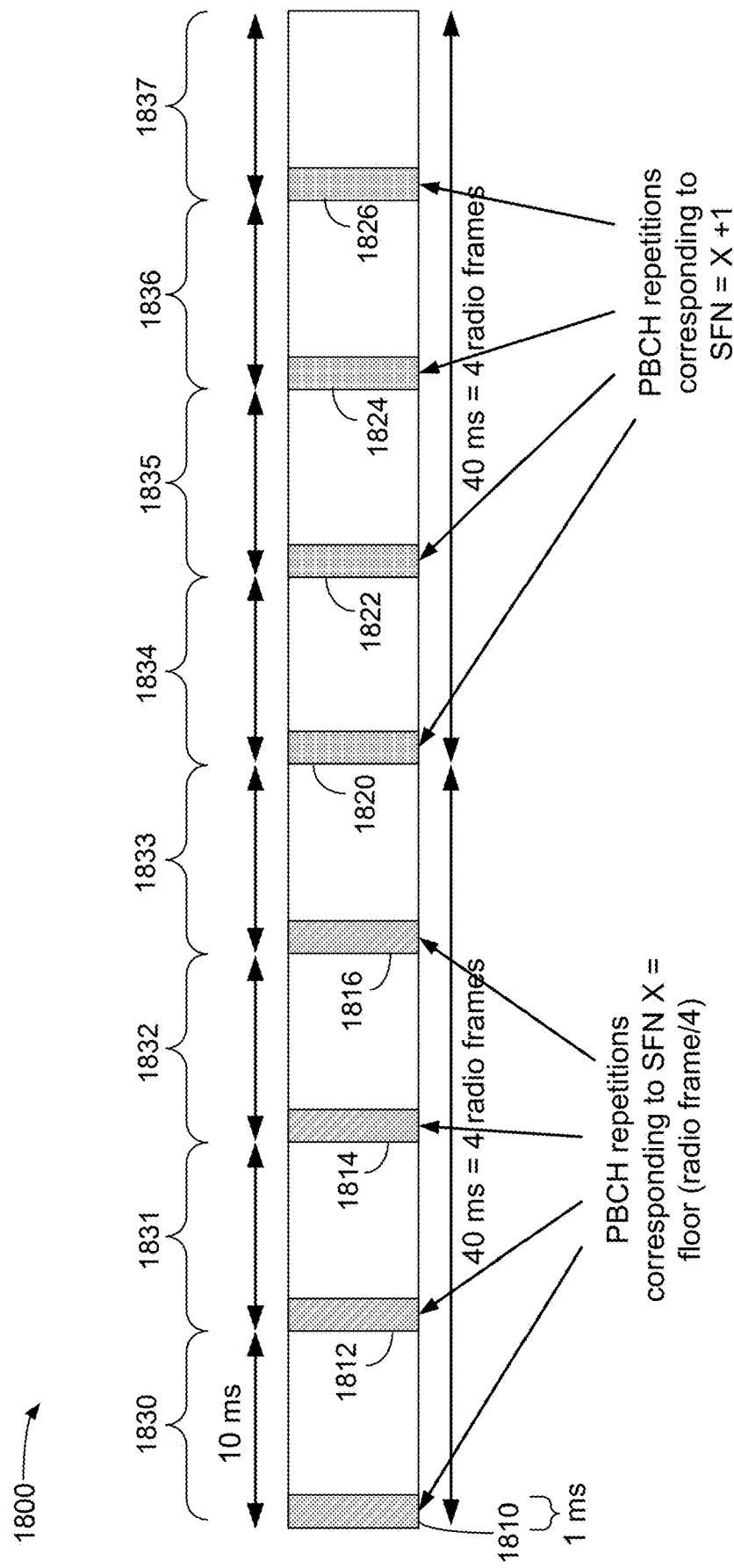
FIG. 18 is a diagram showing an exemplary embodiment of a legacy physical broadcast channel (PBCH).

FIG. 18 is a diagram 1800 showing an exemplary embodiment of a legacy physical broadcast channel (PBCH). A PBCH is present in the downlink communications only, that is, from the base station to a UE. In LTE, a radio frame may have a duration of ten (10) ms and may comprise 10 subframes of 1 ms each. Radio frames 1830 through 1837 are shown in FIG. 18 for illustrative purposes. A PBCH with the same payload data may be sent using four (4) repetitions over 4 contiguous radio frames starting from a radio frame with an index that is a multiple of 4. This may be shown using PBCH repetitions 1810, 1812, 1814 and 1816 that occur over the four contiguous radio frames 1830, 1831, 1832 and 1833. A PBCH on the next 4 radio frames 1834, 1835, 1836 and 1837, may comprise different data than the PBCH repetitions 1810, 1812, 1814 and 1816 and is shown by PBCH repetitions 1820, 1822, 1824 and 1826 that occur over the four contiguous radio frames 1834, 1835, 1836 and 1837. The diagram 1800 shows PBCH repetitions 1810, 1812, 1814 and 1816 occurring every 10 ms, which correspond to a system frame number (SFN) "X"=to a floor (radio frame/4). For example, radio frames 1830, 1831, 1832 and 1833 (also referred to as radio frames 0, 1, 2, and 3) may contain 4 repetitions of PBCH (1810, 1812, 1814 and 1816) with a first payload corresponding to SFN 0. Radio frames 1834, 1835, 1836 and 1837 (also referred to as radio frames 4, 5, 6, and 7) may contain 4 repetitions of PBCH (1820, 1822, 1824 and 1826) with a second payload corresponding to SFN "X+1" and so on. The SFN is also included in the payload of each PBCH to aid the UE in determining the radio frame number. In a manner similar to the PBCH, a SIB communication may be sent, for example, once in 20 subframes.

Figure 19:
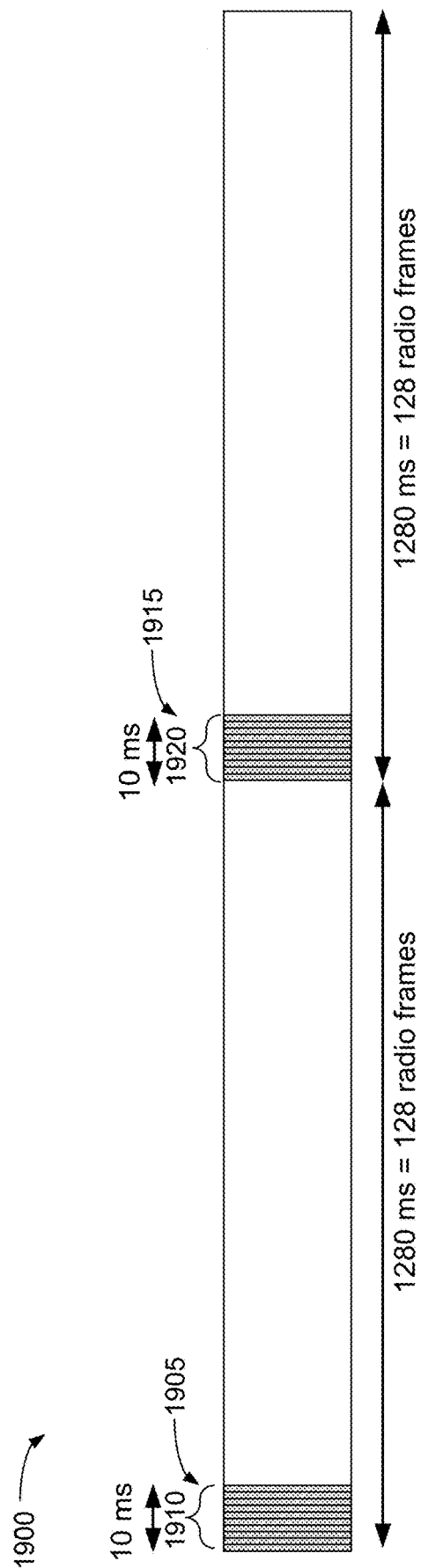
FIG. 19 is a diagram showing an exemplary embodiment of a physical broadcast channel (PBCH) in accordance with various aspects of the present disclosure.

FIG. 19 is a diagram 1900 showing an exemplary embodiment of a physical broadcast channel (PBCH) in accordance with various aspects of the present disclosure. The diagram 1900 shows a modified synchronization channel having a modified synchronization signal, such as a PBCH 1905, having ten (10) PBCH repetitions 1910 over a duration of 10 ms, which corresponds to a modified system frame number (SFN) "X"=to a floor (radio frame/128). The PBCH 1905 may be referred to as a new or modified PBCH, which is more dense in time, (for example, ten (10)) PBCH repetitions in 10 subframes shown in FIG. 19 instead of the four (4) repetitions in 40 subframes, as shown in FIG. 18. The modified PBCH 1905 may also have a longer period (for example, 128 radio frames shown in FIG. 19 instead of four (4) radio frames, as shown in FIG. 18), and may have a modified SFN, as compared to the PBCH shown in FIG. 18. The new SFN shown in FIG. 19 for example has a floor of (radio frame/128) whereas the prior SFN shown in FIG. 18 has a floor of (radio frame/4).

The diagram 1900 also shows a modified PBCH 1915 having ten (10) PBCH repetitions 1920 over a duration of 10 ms, which, similar to the ten (10) PBCH repetitions 1910 over a duration of 10 ms, corresponds to a system frame number (SFN) "X"+1, is more dense in time than the PBCH shown in FIG. 18, and has a longer period and a modified SFN, similar to the ten (10) PBCH repetitions 1910.

When a UE awakens from sleep, if it has a small timing error, it can likely correct the small timing error by detecting the location of the synchronization signals. For example, the legacy LTE synchronization signals (PSS/SSS) can allow the UE to correct timing errors up to about +/−5 ms as the legacy synchronization signals are sent every 5 ms with an alternating pattern. However, if the UEs timing is off by an amount larger than what can be corrected by synchronization signals alone (for example the UE does not know the radio frame number because the UE has been in a deep sleep state), the UE may have to go on to also decode the PBCH to obtain synchronization. Similarly, SIB communications could also be sent using this higher time density signal after the PBCH is sent. This could also be done for a new information block comprising relevant information from both the SIB and the MIB.

In an exemplary embodiment, the modem in the UE may be implemented using the controller/processor 659, the TX processor 668, or other components in the UE 650 (FIG. 6), and may be configured to processes the modified synchronization signal and awaken, or perform other actions, based on the contents of and/or characteristics of the modified synchronization signal.

In an exemplary embodiment, the PBCH signal and channel with similar type of information may be sent using two patterns. One pattern may comprise sending the PBCH signal once every 10 subframes and a 40 ms period, such as that shown in FIG. 18. Another pattern may comprise sending the modified PBCH signal once per subframe for several contiguous subframes (e.g., 10 contiguous subframes, or another number of contiguous subframes) and a 1280 ms period, such as that shown in FIG. 19. In an exemplary embodiment, a UE may determine which pattern to monitor based on its timing error, or other factors.

In an exemplary embodiment, the modified synchronization signal 1905 and 1915 may use a bandwidth different from a bandwidth used by an existing non-modified synchronization signal. In an exemplary embodiment, the modified synchronization signals 1905 and 1915 show a modified synchronization signal that may use a unique cell identification (ID) dependent sequence to distinguish from an existing (non-modified) synchronization signal.

For eDRX synchronization optimization, particularly for system information (SI) optimization, decoding the PBCH and SIB can take a long time as they are sent infrequently (e.g., one subframe in 20 subframes for SIB, one subframe in 10 subframes for PBCH). Accordingly, the modified PBCH 1910, 1920, etc., can be sent with the higher time density than the existing PBCH but with lower overall period than the existing PBCH, as mentioned above. For example, the modified PBCH 1910, 1920, can be sent in 128 contiguous subframes once every 10 seconds. For NB-IoT this adds overhead of ~1%.

Since the timing drift could change over time, it is also possible to have multiple configurations, e.g., send the modified PBCH for 128 subframes every 5 seconds, send the modified PBCH for 512 subframes every 20 minutes, etc.

The modified PBCH payload may be changed with respect to a regular PBCH to remove bits that the UE already knows or to include additional information such as SIB value tag so the UE need not decode the SIB if the SIB has not changed.

Similarly a modified SIB could be sent using higher time density after the PBCH. This could also be done for a new information block comprising relevant information from both the SIB and the MIB. In an exemplary embodiment, the modified PBCH and the modified SIB may include at least some payload bits that are the same as payload bits in a non-modified PBCH and a non-modified SIB.

When the UE enters sleep for period larger than the modification period of the SIBs, at wake up it may monitor for PBCH and SIB for changes before it can monitor for a wake-up signal as changes in PBCH and SIB could affect the location/interpretation of the wake-up signal. To reduce power consumption, design changes may be introduced to enable the UE to decode the wake-up signal without having the most current SIB and also allow the UE to decode the PBCH/SIB on detection of its wake-up signal. For example, the modification period of the wake-up signal and wake-up signal related parameters may be larger than the modification period of a SIB. A UE may hence in many cases be able to monitor the wake-up signal even though the UE may not have the current PBCH/SIB information. In these cases the UE may decode the PBCH/SIB after detecting the wake-up signal if needed.

Regarding power savings, in an exemplary embodiment, a UE in eDRX mode could awaken just before the modified PBCH, decode the modified PBCH and enter light sleep instead of deep sleep as in the worst case the PDCCH monitoring period might be just around the next PBCH period. This may assume a +/−X ms uncertainty in timing and 10 second period of the modified PBCH. In an exemplary embodiment, a UE could perform this search for the PBCH from location −X to +X. Assuming that power consumption during light sleep is 10 units, and power consumption during active decode is 100 units, and being active for one subframe (SF)+macro sleep for nine subframes is 60 units.

With this modified PBCH 1905, the time used for PBCH decode may be 2X+64. A worst case power consumption is (2X+64)*100+10*1000=16400+200X assuming the PDCCH monitoring is 1000 subframes away. With existing PBCH, the time used for PBCH decode is 2X+640 ms and hence power consumption is (2X+640)×60 (assuming some macro sleep reduces power consumption) ~38400+120X.

For small values of X (e.g., if the eDRX cycle is every 12 minutes) about 50% of the PBCH power can be saved. If the actual number of repetitions for PBCH is smaller, the % savings in the gains would be reduced. For eMTC the gains may be smaller if number of SFs required to decode PBCH is smaller.

Figure 20:
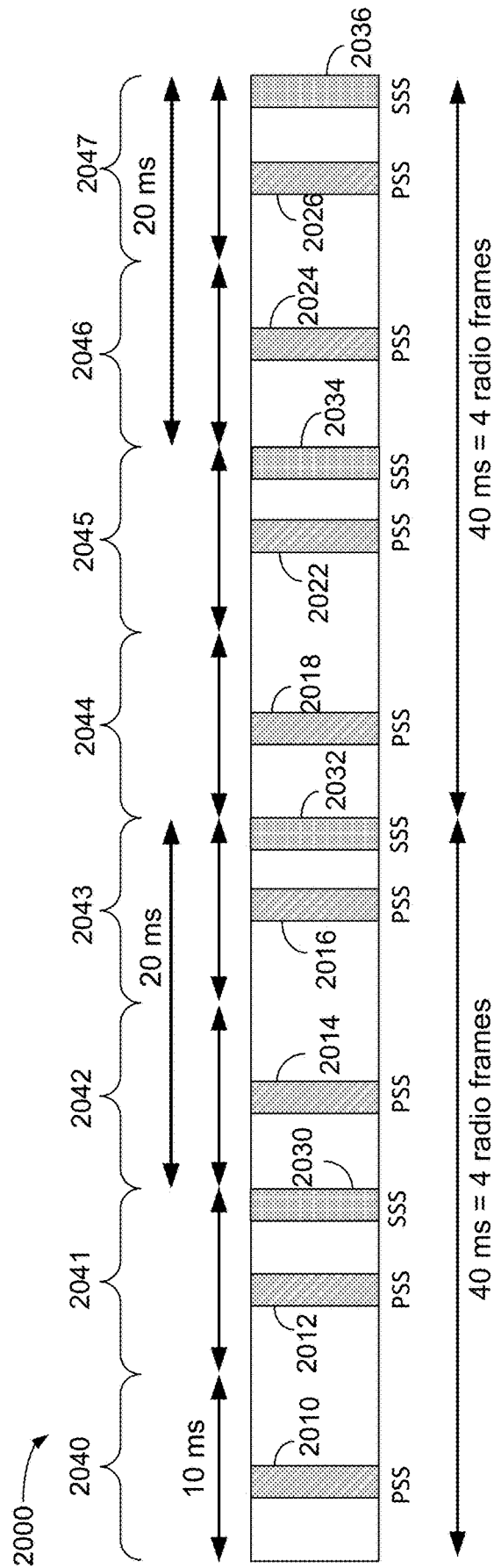
FIG. 20 is a diagram showing an example of legacy synchronization signals.

FIG. 20 is a diagram 2000 showing an example of legacy synchronization signals for NB-IoT. In the diagram 2000, NPSS signals 2010, 2012, 2014, 2016, 2018, 2022, 2024 and 2026 occur periodically, typically once in each 10 ms radio frame. Exemplary radio frames 2040 through 2047 are shown for illustrative purposes. In the diagram 2000, NSSS signals 2030, 2032, 2034, and 2036, also occur periodically, once every two radio frames. To synchronize to the network, especially at low signal-to-noise ratio (SNR) the UE may monitor more than one occurrence of these NPSS and NSSS synchronization signals. The UE thus has to stay awake for a long time to receive all these repetitions.

Figure 21:
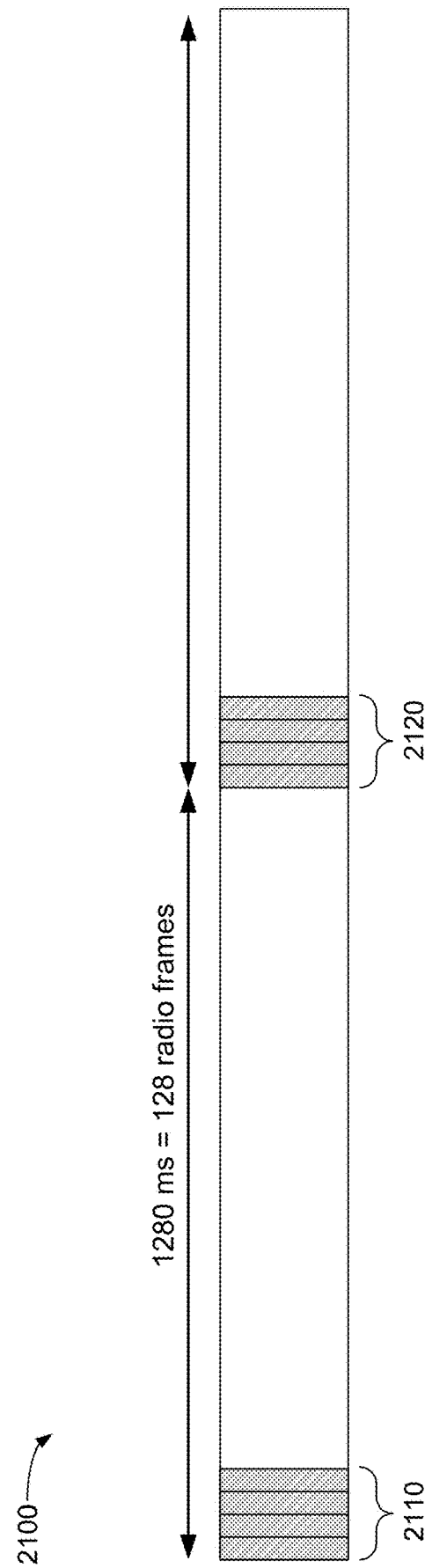
FIG. 21 is a diagram showing an example of synchronization signals in accordance with various aspects of the present disclosure.

FIG. 21 is a diagram 2100 showing an example of synchronization signals in accordance with various aspects of the present disclosure. In the diagram 2100, synchronization signals 2110 and 2120 occur every, for example, 1280 ms (128 radio frames), and are dense in time, but have a longer channel period than that shown in FIG. 20. Since the repetitions of the synchronization signals 2110 and 2120 are close to each other, a UE waking up from sleep and having a rough notion of timing (e.g., the UE does not know the subframe boundary, but the timing error is known to be within a subframe duration), the UE can wake up in the vicinity of these higher density but lower period synchronization signals 2110 and 2120, monitor one or more repetitions to obtain timing synchronization (e.g., determine the subframe boundary) and complete the synchronization process in a significantly shorter period of time than with the legacy synchronization signals which are spaced farther apart in time than the synchronization signals 2110 and 2120.

For example, the SSS (or NSSS), or a new synchronization signal could be sent on 20 contiguous subframes every 5 seconds. Since the timing drift could change over time, it is also possible to have multiple configurations, e.g., 20 subframes every 5 seconds, 100 subframes every minute, etc.

In an exemplary embodiment, a UE may be configured by a base station (610 of FIG. 6), or may be pre-configured, to monitor a modified synchronization channel and receive the modified synchronization signals of, for example, FIG. 19 and/or FIG. 21.

In an exemplary embodiment, a modified synchronization channel shown in, for example, FIG. 19 and/or FIG. 21, may include a primary synchronization signal (PSS) and/or a secondary synchronization signal (SSS).

In an exemplary embodiment, a time period of transmission of the modified synchronization channel may be larger than a time period of transmission of a non-modified synchronization channel, and the transmission in one time period comprises multiple retransmissions of the same payload information, and the multiple retransmissions of the same payload information are denser in time for the modified synchronization channel than that for the non-modified synchronization channel, as shown in FIG. 19 and FIG. 21.

In an exemplary embodiment, the modified synchronization channel has a different number of retransmissions of the same payload information than the non-modified synchronization channel.

In an exemplary embodiment, the multiple retransmissions of the same payload information may use different redundancy versions and scrambling codes.

In an exemplary embodiment, it is possible to decouple the DRX cycle from a measurement reporting cycle. Typically the requirements to report/react to a measurement event (such as a serving cell falling below threshold, neighbor cell becoming stronger, cell reselection) etc., are coupled to the DRX cycle. Example events are reported within 1 or 2 DRX cycles. There is no reason to couple event reporting to the DRX cycle apart from perhaps the observation that a UE awakens every DRX cycle. The above measurement reporting cycle is related to mobility while the DRX cycle is related to latency of data transfer. IoT use cases may have stationary UEs but data latency requirements may still be high. For IoT use cases, the length of the measurement event reporting cycle may be increased to larger values (e.g. much larger multiple of DRX cycle) or may be an independently configured number. The UE thus need not perform measurements in every DRX cycle and/or can monitor the wake-up signal and reenter sleep quicker.

Figure 22:
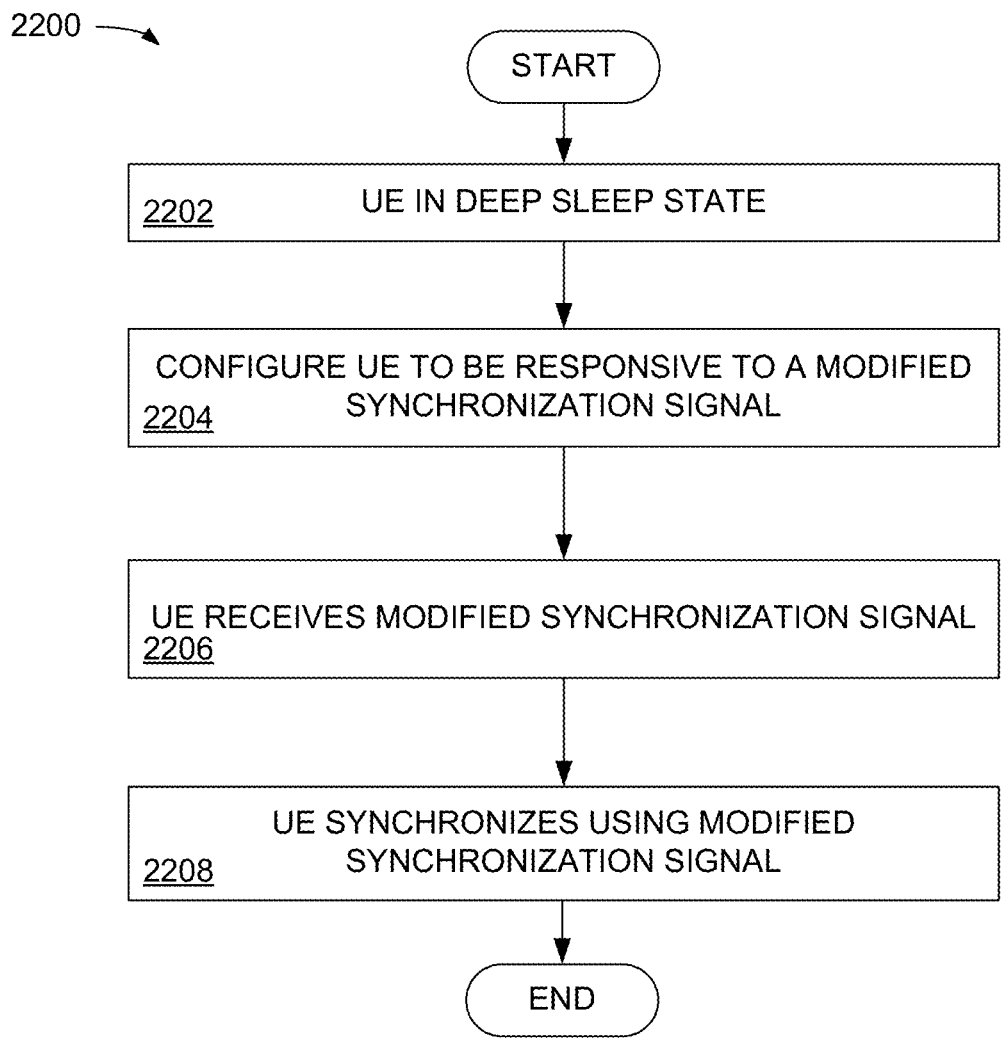
FIG. 22 is a flow chart showing a method for a synchronization channel in accordance with various aspects of the present disclosure.

FIG. 22 is a flow chart 2200 showing a method for a synchronization channel in accordance with various aspects of the present disclosure. The blocks in the method 2200 may be performed in or out of the order shown. One or more of the blocks in the method 2200 may be performed in parallel with one or more other blocks in the method 2200.

In block 2202, a UE may be in a deep sleep state, such as in deep sleep state 1530 between eDRX cycles.

In block 2204, a UE may be configured to be responsive to a modified synchronization signal. In an exemplary embodiment, the modified synchronization signal may comprise one or more of the modified synchronization signals described herein, and may be sent over the modified synchronization channel described herein. In an exemplary embodiment, a UE may be configured for the modified synchronization channel and modified synchronization signal by a base station.

In block 2206, a UE may receive the modified synchronization signal.

In block 2208, a UE may synchronize to the communication network using the modified synchronization signal.

Figure 23:
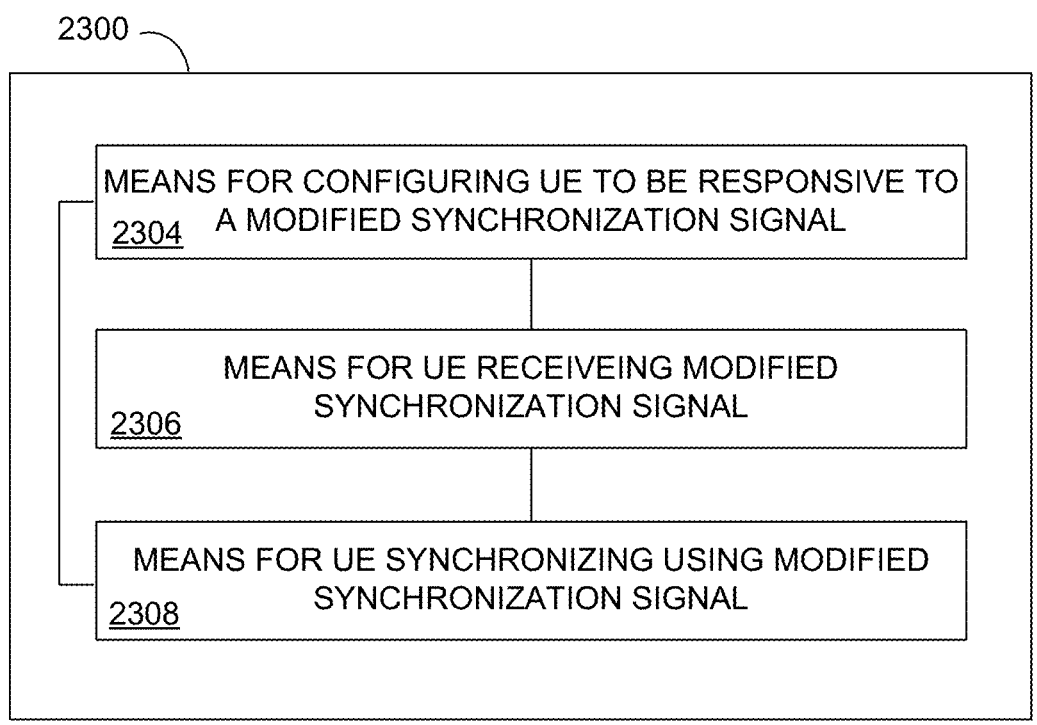
FIG. 23 is a functional block diagram of an apparatus for a synchronization channel in accordance with an exemplary embodiment of the disclosure.

FIG. 23 is a functional block diagram of an apparatus 2300 for a synchronization channel in accordance with various aspects of the present disclosure in accordance with an exemplary embodiment of the disclosure. The apparatus 2300 comprises means 2304 for configuring a UE to be responsive to a modified synchronization signal. In certain embodiments, the means 2304 for configuring a UE to be responsive to a modified synchronization signal can be configured to perform one or more of the functions described in operation block 2204 of method 2200 (FIG. 22). In an exemplary embodiment, the means 2304 for configuring a UE to be responsive to a modified synchronization signal may comprise the base station 610 configuring a UE 650 to be responsive to a modified synchronization signal, such as a modified synchronization signal of FIG. 19 and/or FIG. 21.

The apparatus 2300 comprises means 2306 for a UE receiving a modified synchronization signal. In certain embodiments, the means 2306 for a UE receiving a modified synchronization signal can be configured to perform one or more of the functions described in operation block 2206 of method 2200 (FIG. 22). In an exemplary embodiment, the means 2306 for a UE receiving a modified synchronization signal may comprise the UE 650 receiving a modified synchronization signal, such as a modified synchronization signal of FIG. 19 and/or FIG. 21.

The apparatus 2300 comprises means 2308 for a UE synchronizing using a modified synchronization signal. In certain embodiments, the means 2308 for a UE synchronizing using a modified synchronization signal can be configured to perform one or more of the functions described in operation block 2208 of method 2200 (FIG. 22). In an exemplary embodiment, the means 2308 for a UE synchronizing using a modified synchronization signal may comprise the UE 650 synchronizing to a network using a modified synchronization signal, such as a modified synchronization signal of FIG. 19 and/or FIG. 21.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication in a user equipment (UE), comprising:
   receiving a configuration indicating a selected one of a modified synchronization channel or a non-modified synchronization channel, the modified synchronization channel providing a modified synchronization signal, the non-modified synchronization channel providing a non-modified synchronization signal, the modified synchronization channel comprising at least one of a modified physical broadcast channel (PBCH) and a modified system information block (SIB) communication, the modified synchronization signal having a signal density more dense than a signal density of the non-modified synchronization signal and having a period less frequent than a period of the non-modified synchronization signal;
   periodically awakening and synchronizing to a communication channel using the modified synchronization channel if the configuration indicates the modified synchronization channel is selected; and
   periodically awakening and synchronizing to the communication channel using the non-modified synchronization channel if the configuration indicates the non-modified synchronization channel is selected;
   wherein a time period of transmission of the modified synchronization channel is larger than a time period of transmission of the non-modified synchronization channel, and wherein the transmission of the modified synchronization channel in one time period comprises multiple retransmissions of the same payload information, and wherein the multiple retransmissions of the same payload information are more dense in time for the modified synchronization channel than that for the non-modified synchronization channel.

2. The method of claim 1, further comprising monitoring the communication channel for a wake-up signal (WUS), the WUS having a shorter length than a length of a control channel communication to allow the UE to determine whether the UE should monitor for the control channel communication.

3. The method of claim 2, wherein the UE synchronizes to the communication channel using the wake-up signal.

4. The method of claim 2, wherein a modification period of wake-up signal related parameters is larger than a modification period of a system information block (SIB) communication.

5. The method of claim 1, wherein a UE having a signal-to-noise ratio (SNR) below a threshold synchronizes to the communication channel using the modified synchronization signal and a wake-up signal.

6. The method of claim 1, wherein the modified synchronization signal comprises a wake-up signal, and the UE synchronizes to the communication channel using the modified synchronization signal having the wake-up signal.

7. The method of claim 1, wherein the modified synchronization signal is common to a plurality of UE groups monitoring different wake-up signal search spaces.

8. The method of claim 1, wherein the modified synchronization signal is sent regardless of whether a wake-up signal is sent.

9. The method of claim 1, wherein the modified synchronization signal uses a bandwidth that is different from a bandwidth of the non-modified synchronization signal.

10. The method of claim 1, wherein the modified PBCH and the modified SIB comprise at least one or more payload bits that are the same as payload bits of a non-modified PBCH and a non-modified SIB.

11. The method of claim 1, wherein system frame number (SFN) information in a PBCH payload is modified in the modified PBCH.

12. The method of claim 1, wherein the modified synchronization signal uses a unique cell identification (ID) dependent sequence to distinguish from the non-modified synchronization signal.

13. The method of claim 1, wherein the modified synchronization channel further comprises at least one of a primary synchronization signal (PSS) and a secondary synchronization signal (SSS).

14. The method of claim 1, wherein the modified synchronization channel has a different number of retransmissions of the same payload information than the non-modified synchronization channel.

15. The method of claim 1, wherein the multiple retransmissions of the same payload information may use different redundancy versions and scrambling codes.

16. An apparatus for communication, comprising:
a memory in a user equipment (UE);
a processor in the UE;
the memory and the processor configured to receive a configuration indicating a selected one of a modified synchronization channel or a non-modified synchronization channel, the modified synchronization channel providing a modified synchronization signal, the non-modified synchronization channel providing a non-modified synchronization signal, the modified synchronization channel comprising at least one of a modified physical broadcast channel (PBCH) and a modified system information block (SIB) communication, the modified synchronization signal having a signal density more dense than a signal density of the non-modified synchronization signal and having a period less frequent than a period of the non-modified synchronization signal;
a receiver portion of the UE configured to periodically awaken and synchronize to a communication channel using the modified synchronization channel if the configuration indicates the modified synchronization channel is selected; and
the receiver portion configured to periodically awaken and synchronize to the communication channel using the non-modified synchronization channel if the configuration indicates the non-modified synchronization channel is selected;
wherein a time period of transmission of the modified synchronization channel is larger than a time period of transmission of the non-modified synchronization channel, and wherein the transmission of the modified synchronization channel in one time period comprises multiple retransmissions of the same payload information, and wherein the multiple retransmissions of the same payload information are more dense in time for the modified synchronization channel than that for the non-modified synchronization channel.

17. The apparatus of claim 16, wherein the modified synchronization signal comprises a wake-up signal, and the UE synchronizes to the communication channel using the modified synchronization signal having the wake-up signal.

18. A non-transitory computer-readable medium storing computer executable code for communication, the code executable by a processor to:
receive a configuration indicating a selected one of a modified synchronization channel or a non-modified synchronization channel, the modified synchronization channel providing a modified synchronization signal, the non-modified synchronization channel providing a non-modified synchronization signal, the modified synchronization channel comprising at least one of a modified physical broadcast channel (PBCH) and a modified system information block (SIB) communication, the modified synchronization signal having a signal density more dense than a signal density of the non-modified synchronization signal and having a period less frequent than a period of the non-modified synchronization signal; and
periodically awaken and synchronize to a communication channel using the modified synchronization channel if the configuration indicates the modified synchronization channel is selected; and
periodically awaken and synchronize to the communication channel using the non-modified synchronization channel if the configuration indicates the non-modified synchronization channel is selected;
wherein a time period of transmission of the modified synchronization channel is larger than a time period of transmission of the non-modified synchronization channel, and wherein the transmission of the modified synchronization channel in one time period comprises multiple retransmissions of the same payload information, and wherein the multiple retransmissions of the same payload information are more dense in time for the modified synchronization channel than that for the non-modified synchronization channel.

19. The non-transitory computer-readable medium storing computer executable code for communication of claim 18, wherein the modified synchronization signal comprises a wake-up signal, and the UE synchronizes to the communication channel using the modified synchronization signal having the wake-up signal.

20. The non-transitory computer-readable medium storing computer executable code for communication of claim 18, wherein the modified synchronization signal is common to a plurality of UE groups monitoring different wake-up signal search spaces.

21. An apparatus for communication in a user equipment (UE), comprising:
means for receiving a configuration indicating a selected one of a modified synchronization channel or a non-modified synchronization channel, the modified synchronization channel providing a modified synchronization signal, the non-modified synchronization channel providing a non-modified synchronization signal, the modified synchronization channel comprising at least one of a modified physical broadcast channel (PBCH) and a modified system information block (SIB) communication, the modified synchronization signal having a signal density more dense than a signal density of the non-modified synchronization signal and having a period less frequent than a period of the non-modified synchronization signal;
means for periodically awakening and synchronizing to a communication channel using the modified synchronization channel if the configuration indicates the modified synchronization channel is selected; and means for periodically awakening and synchronizing to the communication channel using the non-modified synchronization channel if the configuration indicates the non-modified synchronization channel is selected;

wherein a time period of transmission of the modified synchronization channel is larger than a time period of transmission of the non-modified synchronization channel, and wherein the transmission of the modified synchronization channel in one time period comprises multiple retransmissions of the same payload information, and wherein the multiple retransmissions of the same payload information are more dense in time for the modified synchronization channel than that for the non-modified synchronization channel.

* * * * *